US012647167B2

(12) United States Patent
Huang et al.

(10) Patent No.: US 12,647,167 B2
(45) Date of Patent: Jun. 2, 2026

(54) MULTI-MODE PRECODING MATRIX INFORMATION REPORT FOR ORBITAL ANGULAR MOMENTUM BASED COMMUNICATION SYSTEM

(71) Applicant: QUALCOMM Incorporated, San Diego, CA (US)

(72) Inventors: Min Huang, Beijing (CN); Yu Zhang, San Diego, CA (US); Chao Wei, Beijing (CN); Wei Xi, Beijing (CN); Rui Hu, Beijing (CN); Kangqi Liu, San Diego, CA (US); Chenxi Hao, Beijing (CN); Liangming Wu, Beijing (CN); Jing Dai, Beijing (CN); Hao Xu, Beijing (CN); Wanshi Chen, San Diego, CA (US); Danlu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 295 days.

(21) Appl. No.: 18/257,270

(22) PCT Filed: Mar. 4, 2022

(86) PCT No.: PCT/CN2022/079211
§ 371 (c)(1),
(2) Date: Jun. 13, 2023

(87) PCT Pub. No.: WO2022/184161
PCT Pub. Date: Sep. 9, 2022

(65) Prior Publication Data
US 2024/0048209 A1    Feb. 8, 2024

(30) Foreign Application Priority Data

Mar. 5, 2021    (WO) ............... PCT/CN2021/079245

(51) Int. Cl.
*H04B 7/06*    (2006.01)
*H01Q 1/24*    (2006.01)
(Continued)

(52) U.S. Cl.
CPC ............. *H04B 7/0639* (2013.01); *H01Q 1/24* (2013.01); *H01Q 21/061* (2013.01);
(Continued)

(58) Field of Classification Search
None
See application file for complete search history.

(56) References Cited

U.S. PATENT DOCUMENTS

2015/0269493 A1*  9/2015  Hu ......................... G06N 99/00
                                                     706/12
2015/0372398 A1   12/2015  Dudorov et al.
(Continued)

FOREIGN PATENT DOCUMENTS

CN        104885302 A     9/2015
CN        109946642 A     6/2019
(Continued)

OTHER PUBLICATIONS

International Search Report and Written Opinion—PCT/CN2021/079245—ISA/EPO—Dec. 7, 2021.
(Continued)

*Primary Examiner* — Minh Trang T Nguyen
(74) *Attorney, Agent, or Firm* — Holland & Hart LLPQualcomm Incorporated

(57) ABSTRACT

Methods, systems, and devices for wireless communications are described. A receiving device may receive, from a transmitting device, a configuration indicating a set of orbital angular momentum (OAM) modes for joint reporting, where at least one of the set of OAM modes is associated with transmission via two or more of a plurality
(Continued)

of sets of antennas arranged in a set of concentric circular arrays. The receiving device may transmit, to the transmitting device, a report indicating precoding information for each of at least a subset of the set of OAM modes, where the precoding information includes one or more first parameters common to the set of OAM modes and one or more second parameters for respective ones of the at least the subset of the set of OAM modes.

30 Claims, 18 Drawing Sheets

(51) Int. Cl.

| | | |
|---|---|---|
| *H01Q 21/06* | (2006.01) | |
| *H01Q 21/20* | (2006.01) | |
| *H01Q 25/04* | (2006.01) | |
| *H04B 7/08* | (2006.01) | |

(52) U.S. Cl.
CPC ............. *H01Q 21/20* (2013.01); *H01Q 25/04* (2013.01); *H04B 7/063* (2013.01); *H04B 7/066* (2013.01); *H04B 7/0691* (2013.01); *H04B 7/0874* (2013.01)

(56) References Cited

U.S. PATENT DOCUMENTS

| | | | | |
|---|---|---|---|---|
| 2017/0117626 A1* | 4/2017 | Sajuyigbe | .............. | H01Q 1/523 |
| 2020/0296599 A1* | 9/2020 | Sasaki | .................. | H04B 7/0469 |
| 2023/0096819 A1* | 3/2023 | Ni | ........................ | H04B 7/0639 |
| | | | | 343/702 |

FOREIGN PATENT DOCUMENTS

| | | |
|---|---|---|
| WO | WO-2016164146 A2 | 10/2016 |
| WO | WO-2019059408 A1 | 3/2019 |

OTHER PUBLICATIONS

International Search Report and Written Opinion—PCT/CN2022/079211—ISA/EPO—Jun. 6, 2022.

Yu W., et al., "Distorted Channel Correction for UCA Based OAM Communication", 2020 IEEE 6th International Conference on Computer and Communications, Dec. 31, 2020 (Dec. 31, 2020), 5 Pages, the whole document.

* cited by examiner

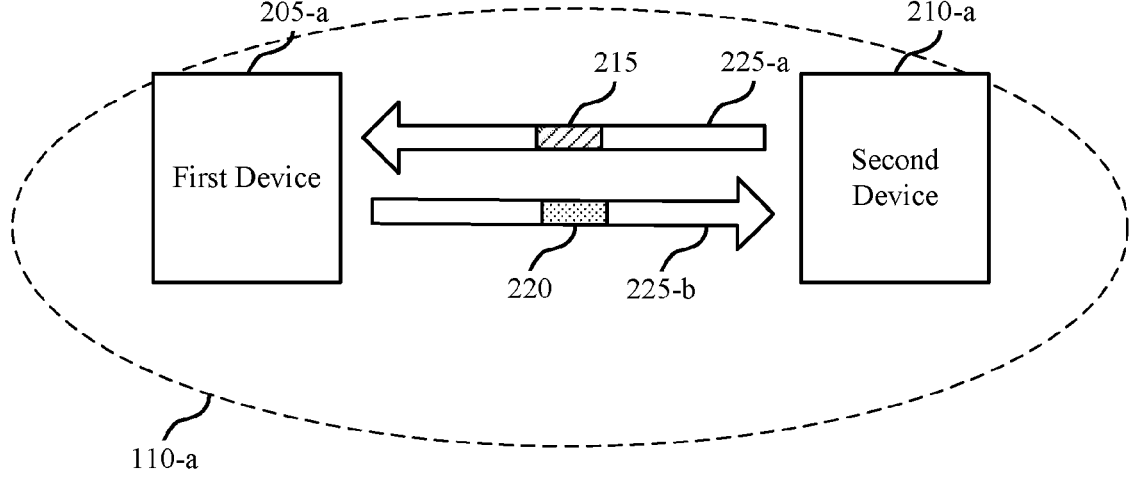
Configuration
Report
FIG. 2
200

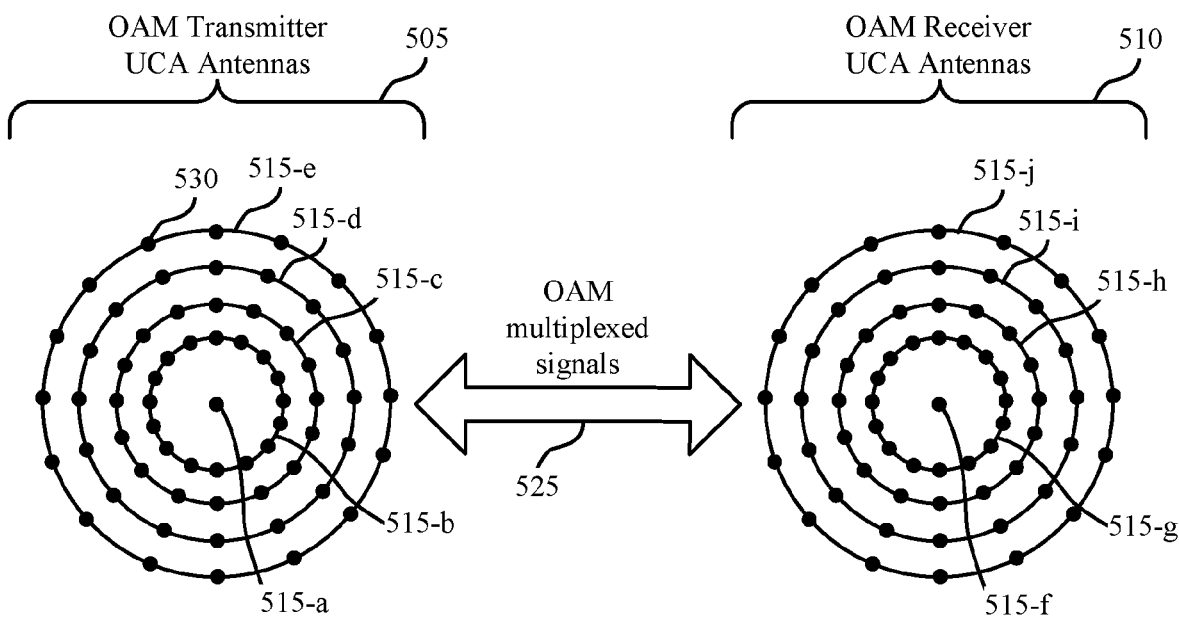
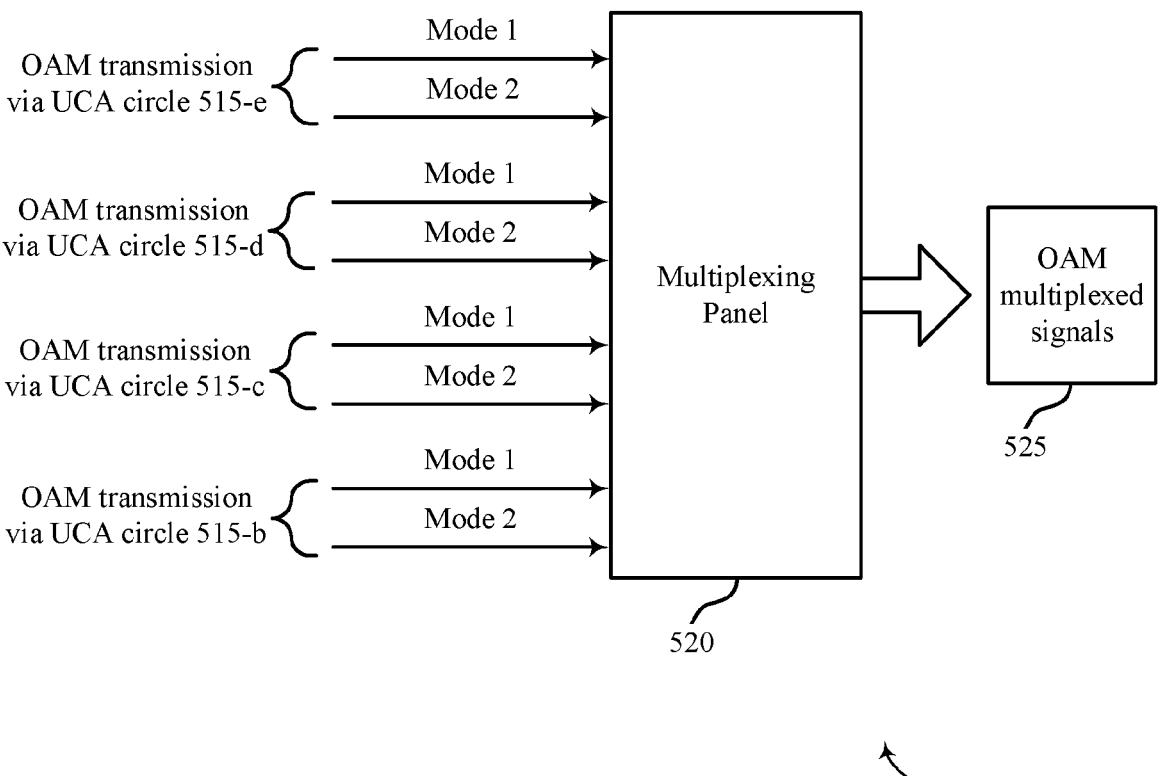
FIG. 5

1110

1120

1115

1105

1100

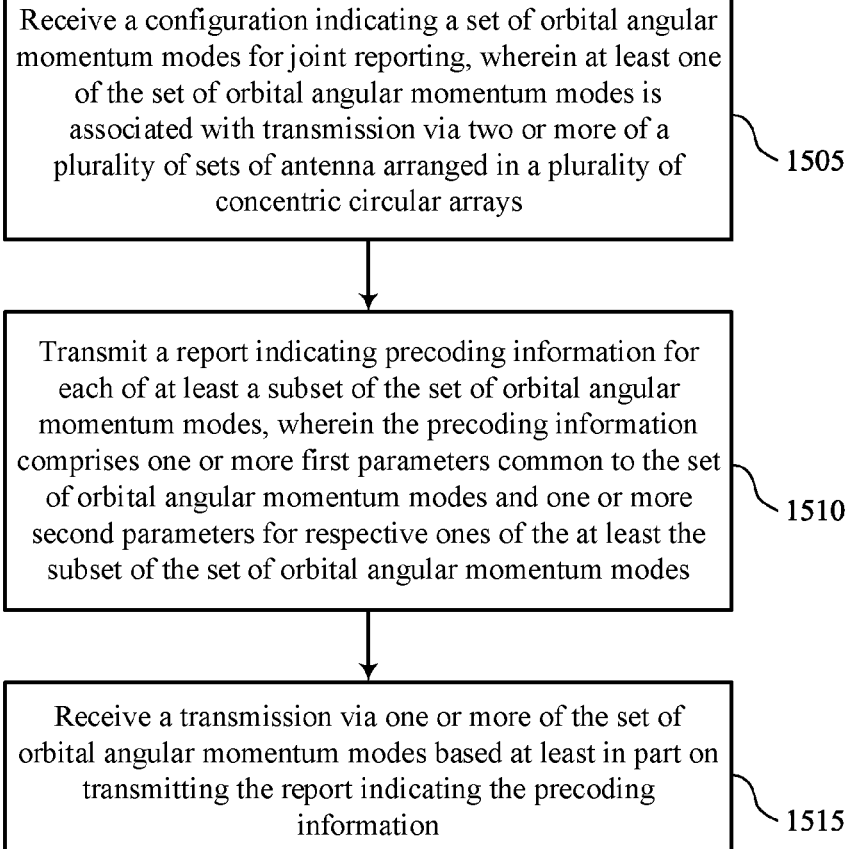

Receive a configuration indicating a set of orbital angular momentum modes for joint reporting, wherein at least one of the set of orbital angular momentum modes is associated with transmission via two or more of a plurality of sets of antenna arranged in a plurality of concentric circular arrays

1505

Transmit a report indicating precoding information for each of at least a subset of the set of orbital angular momentum modes, wherein the precoding information comprises one or more first parameters common to the set of orbital angular momentum modes and one or more second parameters for respective ones of the at least the subset of the set of orbital angular momentum modes

1510

Receive a transmission via one or more of the set of orbital angular momentum modes based at least in part on transmitting the report indicating the precoding information

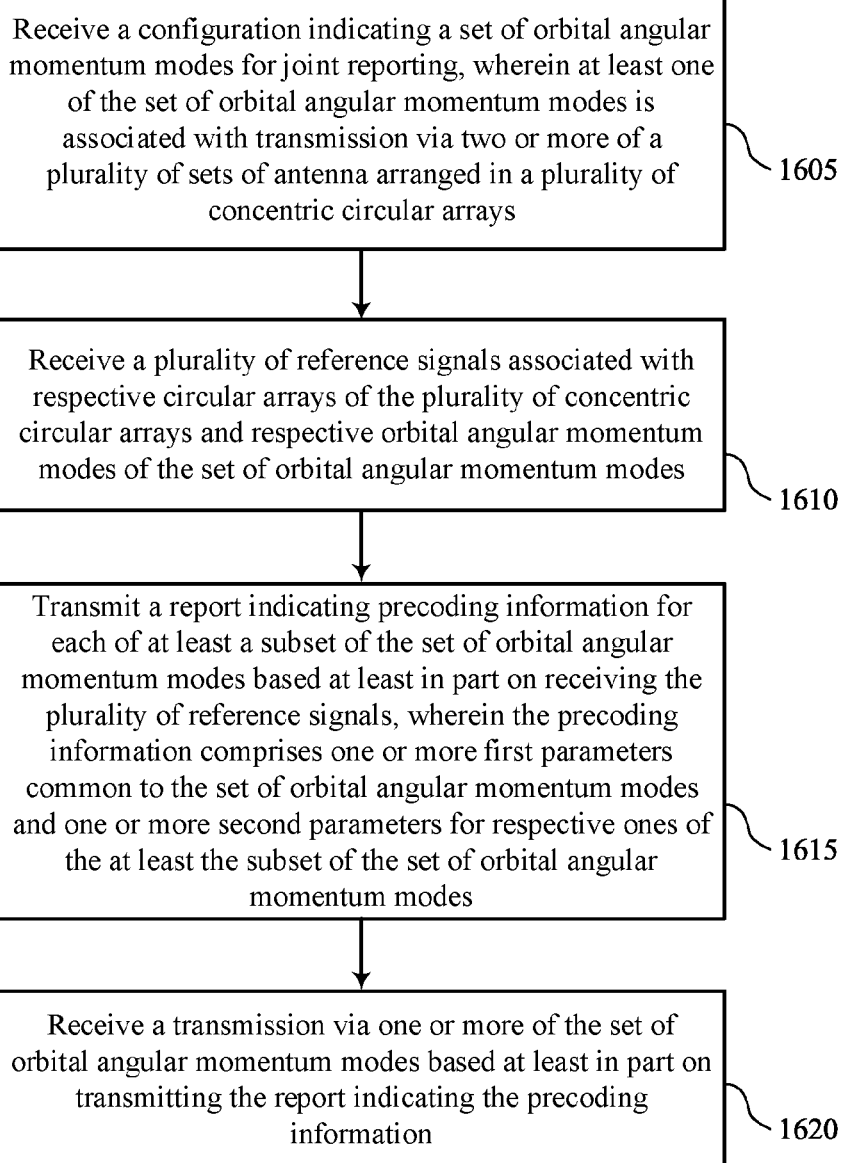

Receive a configuration indicating a set of orbital angular momentum modes for joint reporting, wherein at least one of the set of orbital angular momentum modes is associated with transmission via two or more of a plurality of sets of antenna arranged in a plurality of concentric circular arrays

1605

Receive a plurality of reference signals associated with respective circular arrays of the plurality of concentric circular arrays and respective orbital angular momentum modes of the set of orbital angular momentum modes

1610

Transmit a report indicating precoding information for each of at least a subset of the set of orbital angular momentum modes based at least in part on receiving the plurality of reference signals, wherein the precoding information comprises one or more first parameters common to the set of orbital angular momentum modes and one or more second parameters for respective ones of the at least the subset of the set of orbital angular momentum modes

1615

Receive a transmission via one or more of the set of orbital angular momentum modes based at least in part on transmitting the report indicating the precoding information

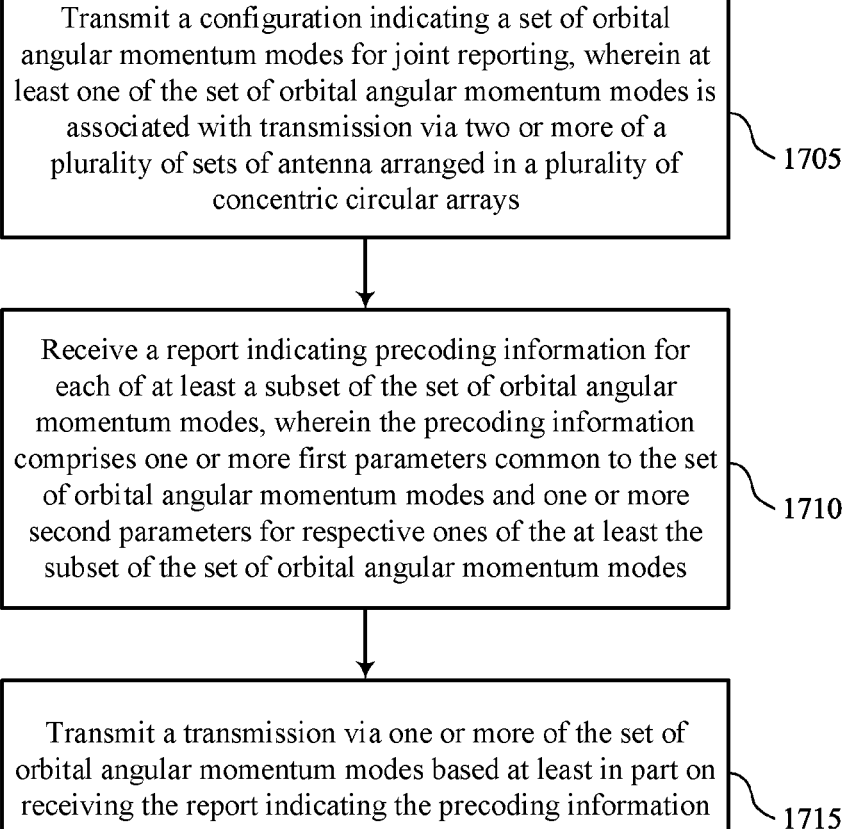

Transmit a configuration indicating a set of orbital angular momentum modes for joint reporting, wherein at least one of the set of orbital angular momentum modes is associated with transmission via two or more of a plurality of sets of antenna arranged in a plurality of concentric circular arrays

1705

Receive a report indicating precoding information for each of at least a subset of the set of orbital angular momentum modes, wherein the precoding information comprises one or more first parameters common to the set of orbital angular momentum modes and one or more second parameters for respective ones of the at least the subset of the set of orbital angular momentum modes

1710

Transmit a transmission via one or more of the set of orbital angular momentum modes based at least in part on receiving the report indicating the precoding information

MULTI-MODE PRECODING MATRIX INFORMATION REPORT FOR ORBITAL ANGULAR MOMENTUM BASED COMMUNICATION SYSTEM

CROSS REFERENCE

The present Application is a 371 national stage filing of International PCT Application No. PCT/CN2022/079211 by HUANG et al. entitled "MULTI-MODE PRECODING MATRIX INFORMATION REPORT FOR ORBITAL ANGULAR MOMENTUM BASED COMMUNICATION SYSTEM," filed Mar. 4, 2022; and claims priority to International Patent Application No. PCT/CN2021/079245 by Huang et al., entitled "MULTI-MODE PRECODING MATRIX INFORMATION REPORT FOR ORBITAL ANGULAR MOMENTUM BASED COMMUNICATION SYSTEM," filed Mar. 5, 2021, each of which is assigned to the assignee hereof, and each of which is expressly incorporated by reference in its entirety herein.

FIELD OF TECHNOLOGY

The following relates to wireless communications, including multi-mode precoding matrix information (PMI) report for orbital angular momentum (OAM) based communication system.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include a number of network entities or network access nodes, each simultaneously supporting communication for multiple communication devices, which may be otherwise known as user equipment (UE). In some systems, such as in orbital angular momentum (OAM)-capable communications systems, wireless devices such as UEs and network entities may communicate using OAM beams.

SUMMARY

The described techniques relate to improved methods, systems, devices, and apparatuses that support multi-mode precoding matrix information (PMI) report for orbital angular momentum based communication system. Generally, the described techniques provide for a wireless device to decrease overhead when communicating PMI for multiple orbital angular momentum (OAM) modes and/or multiple antenna circles. For instance, a first device may receive, from a second device, a set of OAM modes for joint reporting, where at least one of the set of OAM modes is associated with transmission via two or more of a plurality of sets of antennas arranged in a set of concentric circular array. The first device may transmit, to the second device, a report indicating precoding information for each of at least a subset of the set of OAM modes, where the precoding information includes one or more first parameters common to the set of OAM modes and one or more second parameters for respective ones of the at least the subset of the set of OAM modes. The first device may receive, from the second device, a transmission via one or more of the set of OAM modes based on transmitting the report indicating the precoding information.

A method for wireless communication is described. The method may include receiving a configuration indicating a set of OAM modes for joint reporting, where at least one of the set of OAM modes is associated with transmission via two or more of a set of multiple sets of antennas arranged in a set of multiple concentric circular arrays, transmitting a report indicating precoding information for each of at least a subset of the set of OAM modes, where the precoding information includes one or more first parameters common to the set of OAM modes and one or more second parameters for respective ones of the at least the subset of the set of OAM modes, and receiving a transmission via one or more of the set of OAM modes based on transmitting the report indicating the precoding information.

An apparatus for wireless communication is described. The apparatus may include a memory, a transceiver, and at least one processor of a user equipment (UE), the at least one processor coupled with the memory and the transceiver. The at least one processor may be configured to cause the apparatus to receive a configuration indicating a set of OAM modes for joint reporting, where at least one of the set of OAM modes is associated with transmission via two or more of a set of multiple sets of antennas arranged in a set of multiple concentric circular arrays, transmit a report indicating precoding information for each of at least a subset of the set of OAM modes, where the precoding information includes one or more first parameters common to the set of OAM modes and one or more second parameters for respective ones of the at least the subset of the set of OAM modes, and receive a transmission via one or more of the set of OAM modes based on transmitting the report indicating the precoding information.

Another apparatus for wireless communication is described. The apparatus may include means for receiving a configuration indicating a set of OAM modes for joint reporting, where at least one of the set of OAM modes is associated with transmission via two or more of a set of multiple sets of antennas arranged in a set of multiple concentric circular arrays, means for transmitting a report indicating precoding information for each of at least a subset of the set of OAM modes, where the precoding information includes one or more first parameters common to the set of OAM modes and one or more second parameters for respective ones of the at least the subset of the set of OAM modes, and means for receiving a transmission via one or more of the set of OAM modes based on transmitting the report indicating the precoding information.

A non-transitory computer-readable medium storing code for wireless communication is described. The code may include instructions executable by a processor to receive a configuration indicating a set of OAM modes for joint reporting, where at least one of the set of OAM modes is associated with transmission via two or more of a set of multiple sets of antennas arranged in a set of multiple concentric circular arrays, transmit a report indicating precoding information for each of at least a subset of the set of OAM modes, where the precoding information includes one or more first parameters common to the set of OAM modes and one or more second parameters for respective ones of the at least the subset of the set of OAM modes, and receive a transmission via one or more of the set of OAM modes based on transmitting the report indicating the precoding information.

In some examples of the method, apparatuses, and non-transitory computer-readable medium described herein, receiving the configuration indicating the set of OAM modes for joint reporting may include operations, features, means, or instructions for receiving the configuration indicating a threshold quantity of OAM modes of the set of OAM modes for simultaneous transmission via a set of antenna of the set of multiple sets of antennas.

Some examples of the method, apparatuses, and non-transitory computer-readable medium described herein may further include operations, features, means, or instructions for determining a rank of a precoding matrix for the each of at least the subset of the set of OAM modes based on receiving the configuration indicating the threshold quantity of OAM modes of the set of OAM modes.

In some examples of the method, apparatuses, and non-transitory computer-readable medium described herein, each OAM mode of the set of OAM modes may be associated with transmission via one or more of the set of multiple sets of antennas arranged in the set of multiple concentric circular arrays and the method, apparatuses, and non-transitory computer-readable medium may include further operations, features, means, or instructions for receiving a set of multiple reference signals associated with respective circular arrays of the set of multiple concentric circular arrays and respective OAM modes of the set of OAM modes, where transmitting the report may be based on receiving the set of multiple reference signals.

In some examples of the method, apparatuses, and non-transitory computer-readable medium described herein, the configuration indicates a total quantity of circular arrays in the set of multiple concentric circular arrays and transmitting the report may be based on the configuration indicating the total quantity of circular arrays.

Some examples of the method, apparatuses, and non-transitory computer-readable medium described herein may further include operations, features, means, or instructions for estimating a gain matrix for each OAM mode of the set of OAM modes and determining the one or more first parameters common to the set of OAM modes based on estimating the gain matrix for each OAM mode.

Some examples of the method, apparatuses, and non-transitory computer-readable medium described herein may further include operations, features, means, or instructions for determining, for each OAM mode, the one or more second parameters based on the one or more first parameters and the respective estimated gain matrix.

In some examples of the method, apparatuses, and non-transitory computer-readable medium described herein, each OAM mode may be associated with a set of multiple concentric circular arrays and the method, apparatuses, and non-transitory computer-readable medium may include further operations, features, means, or instructions for receiving, for each OAM mode, a set of reference signals corresponding to the respective set of circular arrays, where the gain matrix may be estimated for each OAM mode based on receiving the set of reference signals for each OAM mode.

In some examples of the method, apparatuses, and non-transitory computer-readable medium described herein, the one or more first parameters correspond to a matrix and the method, apparatuses, and non-transitory computer-readable medium may include further operations, features, means, or instructions for determining a dimension of the matrix based on a third parameter indicated by the configuration.

Some examples of the method, apparatuses, and non-transitory computer-readable medium described herein may further include operations, features, means, or instructions for transmitting a set of multiple reports indicating additional precoding information for each circular array of the set of multiple concentric circular arrays, where each report of the plurality includes respective additional precoding information for a different circular array of the set of multiple concentric circular arrays, where transmitting the set of multiple reports may be based on transmitting the report.

Some examples of the method, apparatuses, and non-transitory computer-readable medium described herein may further include operations, features, means, or instructions for reallocating a transmission power for one or more circular arrays of the set of multiple concentric circular arrays, where transmitting the set of multiple reports may be based on the reallocating.

In some examples of the method, apparatuses, and non-transitory computer-readable medium described herein, the one or more first parameters include a set of amplitudes, a set of phases, a set of codeword indices, or any combination thereof.

In some examples of the method, apparatuses, and non-transitory computer-readable medium described herein, the report includes, for one or more OAM modes of the set of OAM modes, the one or more second parameters for a set of multiple layers.

In some examples of the method, apparatuses, and non-transitory computer-readable medium described herein, the configuration includes a channel state information configuration and the report includes a channel state information report.

In some examples of the method, apparatuses, and non-transitory computer-readable medium described herein, the one or more first parameters include an identity matrix.

In some examples of the method, apparatuses, and non-transitory computer-readable medium described herein, one or more of receiving the configuration, transmitting the report, and receiving the transmission may be based on a first polarization, a second polarization, or both.

In some examples of the method, apparatuses, and non-transitory computer-readable medium described herein, the first polarization includes a first linear polarization and the second polarization includes a second linear polarization, the first polarization includes a first rotation direction associated with a circular polarization and the second polarization includes a second rotation direction associated with the circular polarization, and the first polarization includes a first rotation direction associated with an elliptical polarization and the second polarization includes a second rotation direction associated with the elliptical polarization.

A method for wireless communication is described. The method may include transmitting a configuration indicating a set of OAM modes for joint reporting, where at least one of the set of OAM modes is associated with transmission via two or more of a set of multiple sets of antennas arranged in a set of multiple concentric circular arrays, receiving a report indicating precoding information for each of at least a subset of the set of OAM modes, where the precoding information includes one or more first parameters common to the set of OAM modes and one or more second parameters for respective ones of the at least the subset of the set of OAM modes, and transmitting a transmission via one or more of the set of OAM modes based on receiving the report indicating the precoding information.

An apparatus for wireless communication is described. The apparatus may include a memory, a transceiver, and at least one processor of a network entity, the at least one processor coupled with the memory and the transceiver. The at least one processor may be configured to cause the apparatus to transmit a configuration indicating a set of orbital angular momentum modes for joint reporting, where at least one of the set of orbital angular momentum modes is associated with transmission via two or more of a set of multiple sets of antennas arranged in a set of multiple concentric circular arrays, receive a report indicating precoding information for each of at least a subset of the set of OAM modes, where the precoding information includes one or more first parameters common to the set of OAM modes and one or more second parameters for respective ones of the at least the subset of the set of OAM modes, and transmit a transmission via one or more of the set of OAM modes based on receiving the report indicating the precoding information.

Another apparatus for wireless communication is described. The apparatus may include means for transmitting a configuration indicating a set of OAM modes for joint reporting, where at least one of the set of OAM modes is associated with transmission via two or more of a set of multiple sets of antennas arranged in a set of multiple concentric circular arrays, means for receiving a report indicating precoding information for each of at least a subset of the set of OAM modes, where the precoding information includes one or more first parameters common to the set of OAM modes and one or more second parameters for respective ones of the at least the subset of the set of OAM modes, and means for transmitting a transmission via one or more of the set of OAM modes based on receiving the report indicating the precoding information.

A non-transitory computer-readable medium storing code for wireless communication is described. The code may include instructions executable by a processor to transmit a configuration indicating a set of OAM modes for joint reporting, where at least one of the set of OAM modes is associated with transmission via two or more of a set of multiple sets of antennas arranged in a set of multiple concentric circular arrays, receive a report indicating precoding information for each of at least a subset of the set of OAM modes, where the precoding information includes one or more first parameters common to the set of OAM modes and one or more second parameters for respective ones of the at least the subset of the set of OAM modes, and transmit a transmission via one or more of the set of OAM modes based on receiving the report indicating the precoding information.

In some examples of the method, apparatuses, and non-transitory computer-readable medium described herein, transmitting the configuration indicating the set of OAM modes for joint reporting may include operations, features, means, or instructions for transmitting the configuration indicating a threshold quantity of OAM modes of the set of OAM modes for simultaneous transmission via a set of antenna of the set of multiple sets of antennas.

In some examples of the method, apparatuses, and non-transitory computer-readable medium described herein, each OAM mode of the set of OAM modes may be associated with transmission via one or more of the set of multiple sets of antennas arranged in the set of multiple concentric circular arrays and the method, apparatuses, and non-transitory computer-readable medium may include further operations, features, means, or instructions for transmitting respective reference signals for each circular array of the set of multiple concentric circular arrays and each OAM mode of the set of OAM modes, where receiving the report may be based on transmitting the respective reference signals.

In some examples of the method, apparatuses, and non-transitory computer-readable medium described herein, the configuration indicates a total quantity of circular arrays in the set of multiple concentric circular arrays and receiving the report may be based on the configuration indicating the total quantity of circular arrays.

Some examples of the method, apparatuses, and non-transitory computer-readable medium described herein may further include operations, features, means, or instructions for receiving a set of multiple reports indicating additional precoding information for each circular array of the set of multiple concentric circular arrays, where each report of the plurality includes respective additional precoding information for a different circular array of the set of multiple concentric circular arrays, where transmitting the set of multiple reports may be based on transmitting the report.

In some examples of the method, apparatuses, and non-transitory computer-readable medium described herein, the one or more first parameters correspond to a matrix and the configuration indicates a third parameter associated with a size of the matrix.

In some examples of the method, apparatuses, and non-transitory computer-readable medium described herein, the one or more first parameters include a set of amplitudes, a set of phases, a set of codeword indices, or any combination thereof.

In some examples of the method, apparatuses, and non-transitory computer-readable medium described herein, the report includes, for one or more OAM modes of the set of OAM modes, the one or more second parameters for a set of multiple layers.

In some examples of the method, apparatuses, and non-transitory computer-readable medium described herein, the configuration includes a channel state information configuration, the report includes a channel state information report, the one or more first parameters include an identity matrix, or any combination thereof.

In some examples of the method, apparatuses, and non-transitory computer-readable medium described herein, one or more of transmitting the configuration, receiving the report, and transmitting the transmission may be based on a first polarization, a second polarization, or both.

In some examples of the method, apparatuses, and non-transitory computer-readable medium described herein, the first polarization includes a first linear polarization and the second polarization includes a second linear polarization, the first polarization includes a first rotation direction associated with a circular polarization and the second polarization includes a second rotation direction associated with the circular polarization, and the first polarization includes a first rotation direction associated with an elliptical polarization and the second polarization includes a second rotation direction associated with the elliptical polarization.

BRIEF DESCRIPTION OF THE DRAWINGS

FIG. 2 illustrates an example of a wireless communications system that supports multi-mode PMI report for OAM based communication system in accordance with aspects of the present disclosure.

FIG. 5 illustrates an example of a multi-circle uniform circular array-based orbital angular momentum configuration that supports multi-mode PMI report for OAM based communication system in accordance with aspects of the present disclosure.

FIGS. 15 through 18 show flowcharts illustrating methods that support multi-mode precoding matrix information report for orbital angular momentum based communication system in accordance with aspects of the present disclosure.

DETAILED DESCRIPTION

Figure 1:
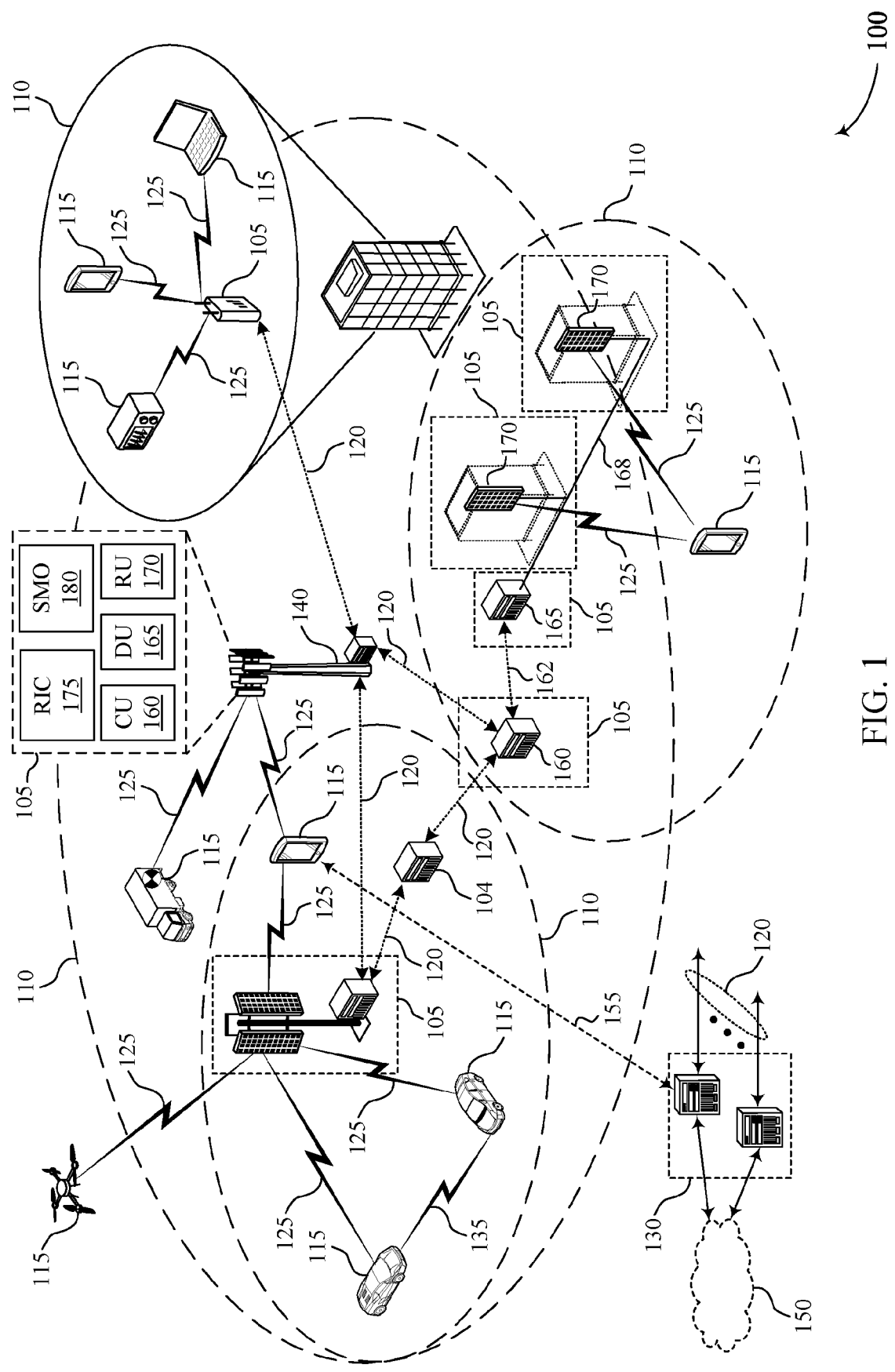
FIG. 1 illustrates an example of a wireless communications system that supports multi-mode precoding matrix information (PMI) report for orbital angular momentum (OAM) based communication system in accordance with aspects of the present disclosure.

In some wireless communications systems, wireless devices, such as network entities or user equipment (UEs), or both, may communicate directionally, for example, using beams to orient communication signals over one or more directions. In some systems, such as in orbital angular momentum (OAM)-capable communications systems, the wireless devices may communicate using OAM beams, which, in addition to providing signal directionality, may also provide an additional dimension for signal or channel multiplexing. In some aspects, for example, such an additional dimension may include a state or a mode of the OAM beam, where different states or modes of OAM beams may be orthogonal to each other. As such, different OAM states or modes may be multiplexed together (also referred to herein as OAM multiplexing) to increase the capacity of an OAM link. In some cases, a wireless device may use spiral phase plate (SPP) or uniform circular array (UCA) based methodologies to generate an OAM beam.

In some cases, a transmitting device and a receiving device may each be equipped with one or more antenna circles (e.g., uniform circular arrays (UCA)) that may allow the transmitting device and the receiving device to communicate according to one or more OAM modes. In an OAM-based communication system in which a transmitting device, or a receiving device, or both are each equipped with multiple antenna circles, the efficiency of each antenna circle (e.g., channel gains of each antenna circle) may be different for each OAM mode. For example, a signal produced by a first antenna circle according to a first OAM mode may have a different channel gain than a signal produced by a second antenna circle according to the first OAM mode. To increase efficiency and throughput in the OAM-based communications system, a transmitting device (e.g., a user equipment (UE), network entity, integrated access and backhaul (IAB) node, relay node, etc.) or a receiving device (e.g., a UE, network entity, IAB node, relay node, etc.), or both may determine a transmission scheme for the transmitting device to use for transmitting messages (e.g., data messages, control messages) to the receiving device. For example, the transmitting device, or the receiving device, or both may be configured to determine which antenna circle of the transmitting device (e.g., transmitter circle) to use for each OAM mode so as to optimize data throughput of each OAM mode.

In some examples, channel conditions between the transmitting device and the receiving device may vary (e.g., may be dynamic). Accordingly, the receiving device may transmit a report (e.g., a channel state information (CSI) report) to the transmitting device that indicates a status (e.g., conditions) of the channel. In some examples, the CSI report may include a precoding matrix indicator (PMI) that may indicate information that the transmitting device may use to determine a precoding matrix for each OAM mode of the receiving device. In some examples, the PMI may include parameters (e.g., a precoding codeword) for each OAM mode individually that accounts for each antenna circle at the receiving device. Accordingly, as the number of antenna circles at the transmitting device and/or the number of OAM modes increase, the overhead associated with transmitting PMI may increase. Increased overhead may lead to delayed communications between the transmitting device and the receiving device.

Techniques, such as those described herein, may enable decreased PMI overhead and may, accordingly, increase the efficiency of communications between the transmitting device and the receiving device. For instance, instead of generating PMI individually for each OAM mode, the receiving device may transmit the PMI in a joint report. The joint report may include a first set of parameters common to each OAM mode and a second set of parameters specific to each OAM mode. For each OAM mode, the transmitting device may use the first set of parameters and the second set of parameters specific to the OAM mode to determine precoding matrices for each OAM mode and/or each antenna circle. Transmitting the PMI in this manner may enable decreased overhead due to parameters common to each OAM mode being reported once (e.g., rather than reporting parameters for OAM modes and/or antenna circles individually).

Aspects of the disclosure are initially described in the context of wireless communications systems. Additional aspects of the disclosure are described in the context of a spiral phase plate OAM configuration, a uniform circular array OAM configuration, a multi-circle uniform circular array OAM configuration, and a process flow. Aspects of the disclosure are further illustrated by and described with reference to apparatus diagrams, system diagrams, and flow-charts that relate to multi-mode PMI report for OAM based communication system.

FIG. 1 illustrates an example of a wireless communications system 100 that supports multi-mode PMI report for OAM based communication system in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support multi-mode precoding matrix information report for orbital angular momentum based communication system as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of TS–1/ $(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beam forming operations. For example, a network entity 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times in different directions. For example, the network entity 105 may transmit a signal according to different beamforming weight sets associated with different directions of transmission. Transmissions in different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by a network entity 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the network entity 105 in different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or radio frequency beamforming to generate a combined beam for transmission (e.g., from a network entity 105 to a UE 115). The UE 115 may report feedback that indicates precoding weights for one or more beam directions, and the feedback may correspond to a configured number of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a network entity 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the network entity 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some wireless communications systems, wireless devices, such as network entities 105 or UEs 115, or both, may communicate directionally, for example, using beams to orient communication signals over one or more directions. In some systems, such as in OAM-capable communications systems, the wireless devices may communicate using OAM beams, which, in addition to providing signal directionality, may also provide additional dimensions for signal or channel multiplexing. OAM communication may provide more efficient communications than other types of communication for fixed communication that occurs at a distance below a threshold (e.g., backhaul or access communications) and/or for communication that occurs at a particular range of frequencies (e.g., frequencies within the terahertz range or below the terahertz range). In some examples, OAM communication may be used for wireless backhaul transmissions (e.g., from a network entity 105 to a relay node), for fixed wireless access (e.g., from a network entity 105 to a fixed UE 115 or for a customer-premises equipment or customer-provided equipment), for inter-device transmissions (e.g., from fixed UE to another fixed UE or as an inter-server connection in a data center), or any combination thereof.

In some aspects, for example, one additional dimension may include a state or a mode of the OAM beam, where different states or modes of OAM beams may be orthogonal to each other. As such, different OAM states or modes may be multiplexed together to increase the capacity of an OAM link. In some cases, a wireless device may use SPP or UCA based methodologies to generate an OAM beam. In some cases, a transmitting device and a receiving device may each be equipped with one or more antenna circles (e.g., UCAs) that may allow the transmitting device and the receiving device to communicate according to one or more OAM modes. Additionally, another additional dimension may include polarization. Since any OAM mode can be one of two polarizations (e.g., two linear polarizations (e.g., one horizontal and one vertical) or two circular and elliptical polarizations (e.g., clockwise and counter-clockwise)), polarization and OAM mode may be two independent properties of electromagnetic waves and two independent sources of degrees of freedom. In some cases, using a combination of different polarizations and multiple OAM modes may support an increased number (e.g., double) of data streams in OAM-based communications in MIMO compared to OAM-based communications that do not exploit polarization.

In some examples, channel conditions between the transmitting device and the receiving device may vary (e.g., may be dynamic). Accordingly, the receiving device may transmit a report (e.g., a channel state information (CSI) report) to the transmitting device that indicates a status (e.g., conditions) of the channel. In some examples, the CSI report may include a PMI that may indicate information that the transmitting device may use to determine a precoding matrix for each OAM mode of the receiving device. In some examples, the PMI may include parameters (e.g., an indicator of a precoding codeword) for each OAM mode individually that accounts for each antenna circle at the receiving device. Accordingly, as the number of antenna circles at the receiving device and/or the number of OAM modes increase, the overhead associated with transmitting PMI may increase. Increased overhead may lead to delayed communications between the transmitting device and the receiving device.

Techniques, such as those described herein, may enable decreased PMI overhead and may, accordingly, increase the efficiency of communications between the transmitting device and the receiving device. For instance, instead of generating PMI individually for each OAM mode, the receiving device may transmit the PMI in a joint report. The joint report may include a first set of parameters common to each OAM mode and a second set of parameters specific to each OAM mode. For each OAM mode, the transmitting device may use the first set of parameters and the second set of parameters specific to the OAM mode to determine precoding matrices for each OAM mode and/or each antenna circle. Transmitting the PMI in this manner may enable decreased overhead due to parameters common to each OAM mode being reported once (e.g., rather than reporting parameters for OAM modes and/or antenna circles individually).

FIG. 2 illustrates an example of a wireless communications system 200 that supports connection setup in an OAM-based communication system in accordance with aspects of the present disclosure. In some examples, wireless communications system 200 may implement aspects of wireless communications system 100. The wireless communications system 200 may illustrate communication between a first device 205-a and a second device 210-a, where the first device 205-a and the second device 210-a may be the same type of device or may be different types of devices. The first device 205-a and the second device 210-a may each be a UE, a network entity, an IAB node, etc. The first device 205-a and the second device 210-a may be examples of corresponding devices described herein.

In some cases, the first device 205-a or the second device 210-a may serve geographic coverage area 110-a. In some examples, the wireless communications system 200 (which may be an example of a sixth generation (6G) system, a fifth generation (5G) system, or other generation of system) may support OAM-based communications. The first device 205-a and the second device 210-a may transmit or receive OAM beams, or OAM-related signals over communications links 225 within a geographic coverage area 110-a.

For example, the first device 205-a or the second device 210-a may support OAM-based communication by using the OAM of electromagnetic waves to distinguish between different signals. The OAM of electromagnetic waves may be different than the spin angular momentum (SAM) of electromagnetic waves, and both may contribute to the overall angular momentum of an electromagnetic wave as defined in quantum mechanics by Equation 1, shown below.

$$J = \iiint r \times S \, dx \, dy \, dz = E + L \tag{1}$$

As shown in Equation 1, J is equal to the angular momentum of the electromagnetic wave, r is a position vector, $S = E \times H$ and is equal to the Poynting flux, where E is equal to the electric field vector and H is equal to the magnetic field's auxiliary field vector, $\Sigma$ is equal to the SAM of the electromagnetic wave (and is sometimes alternatively denoted as S), and L is equal to the OAM of the electromagnetic wave. In some cases, the SAM of the electromagnetic wave may be associated with the polarization of the electromagnetic wave. For example, an electromagnetic wave may be associated with different polarizations (e.g., circular polarizations), such as left and right. Accordingly, the SAM of the electromagnetic wave may have multiple (e.g., two) degrees of freedom.

In some cases, the OAM of the electromagnetic wave may be associated with a field spatial distribution of the electromagnetic wave, which may be in the form of a helical or twisted wavefront shape (e.g., in examples in which a light beam can be associated with a helical or twisted wavefront). For example, an electromagnetic wave (e.g., a light beam, an optical beam) may be in a helical mode (which may also be referred to as an OAM mode) and such helical modes may be characterized by a wavefront that is shaped as a helix with an optical vortex in the center (e.g., at the beam axis), where each helical mode is associated with a different helical wavefront structure. The helical modes (e.g., OAM modes, which may also be referred to as OAM states) may be defined or referred to by a mode index l, where a sign of the mode index l corresponds to a "handedness" (e.g., left or right) of the helix (or helices) and a magnitude of the mode index l (e.g., |l|) corresponds to a quantity of distinct but interleaved helices of the electromagnetic wave.

For example, for an electromagnetic wave associated with an OAM mode index of l=0, the electromagnetic wave is not helical and the wavefronts of the electromagnetic wave are multiple disconnected surfaces (e.g., the electromagnetic wave is a sequence of parallel planes). For an electromagnetic wave associated with an OAM mode index of l=+1, the electromagnetic wave may propagate in a right-handed sense (e.g., has a right circular polarization or may be understood as having a clockwise circular polarization) and the wavefront of the electromagnetic wave may be shaped as a single helical surface with a step length equal to a wavelength $\lambda$ of the electromagnetic wave. Likewise, the phase delay over one revolution of the electromagnetic wave may be equal to $2\pi$. Similarly, for an OAM mode index of l=−1, the electromagnetic wave may propagate in a left-handed sense (e.g., has a left circular polarization or may be understood as having a counter-clockwise circular polarization) and the wavefront of the electromagnetic wave may be also be shaped as a single helical surface with a step length equal to the wavelength $\lambda$ of the electromagnetic wave. Likewise, the phase delay over one revolution of the electromagnetic wave may be equal to $-2\pi$.

For further example, for an OAM mode index of l=±2, the electromagnetic wave may propagate in either a right-handed sense (if +2) or in a left-handed sense (if −2) and the wavefront of the electromagnetic wave may include two distinct but interleaved helical surfaces. In such examples, the step length of each helical surface may be equal to $\lambda/2$. Likewise, the phase delay over one revolution of the electromagnetic wave may be equal to $\pm 4\pi$. In general terms, a mode-l electromagnetic wave may propagate in either a right-handed sense or a left-handed sense (depending on the sign of l) and may include l distinct but interleaved helical surfaces with a step length of each helical surface equal to $\lambda/|l|$. Likewise, the phase delay over one revolution of the electromagnetic wave may be equal to $2l\pi$. In some examples, an electromagnetic wave may be indefinitely extended to provide for an infinite number of degrees of freedom of the OAM of the electromagnetic wave (e.g., l=−∞, . . . , −2, −1, 0, +1, +2, . . . , +∞). As such, the OAM of the electromagnetic wave (e.g., L as defined in Equation 1) may be associated with infinite degrees of freedom.

In some examples, the OAM mode index l of an electromagnetic wave may correspond to or otherwise function as (e.g., be defined as) an additional dimension for signal or channel multiplexing. For example, each OAM mode or state (of which there may be infinite), may function similarly (e.g., or equivalently) to a communication channel, such as a sub-channel. In other words, an OAM mode or state may correspond to a communication channel, and vice versa. For instance, the first device 205-a or the second device 210-a may communicate separate signals using electromagnetic waves having different OAM modes or states similarly to how the first device 205-a or the second device 210-a may transmit separate signals over different communication channels. In some aspects, such use of the OAM modes or states of an electromagnetic wave to carry different signals may be referred to as the use of OAM beams.

Additionally, in some examples, electromagnetic waves with different OAM modes (e.g., OAM states) may be mutually orthogonal to each other (e.g., in a Hilbert sense, in which a space may include an infinite set of axes and sequences may become infinite by way of always having another coordinate direction in which next elements of the sequence can go). Likewise, in a Hilbert sense, orthogonal OAM modes or states may correspond to orthogonal communication channels (e.g., orthogonal sequences transmitted over a communication channel) and, based on the potentially infinite number of OAM modes or states, the wireless communications system 200 employing the use of OAM beams may theoretically achieve infinite capacity. For example, in theory, an infinite number of OAM states or modes may be twisted together for multiplexing and the capacity of the OAM link can approach infinity while preserving orthogonality between signals carried by different OAM modes (e.g., indices). In practice, however, due to non-ideal factors (e.g., Tx/Rx axial or position placement error, propagation divergence, and the like), crosstalk among OAM modes at the receiver may result, and thus a reduced number of concurrent OAM modes may be implemented between wireless devices (e.g., two or four concurrent OAM modes). In some cases, the first device 205-a or the second device 210-a may generate such OAM beams using SPP or UCA methodologies, such as discussed with reference to FIGS. 3 and 4.

Figure 4:
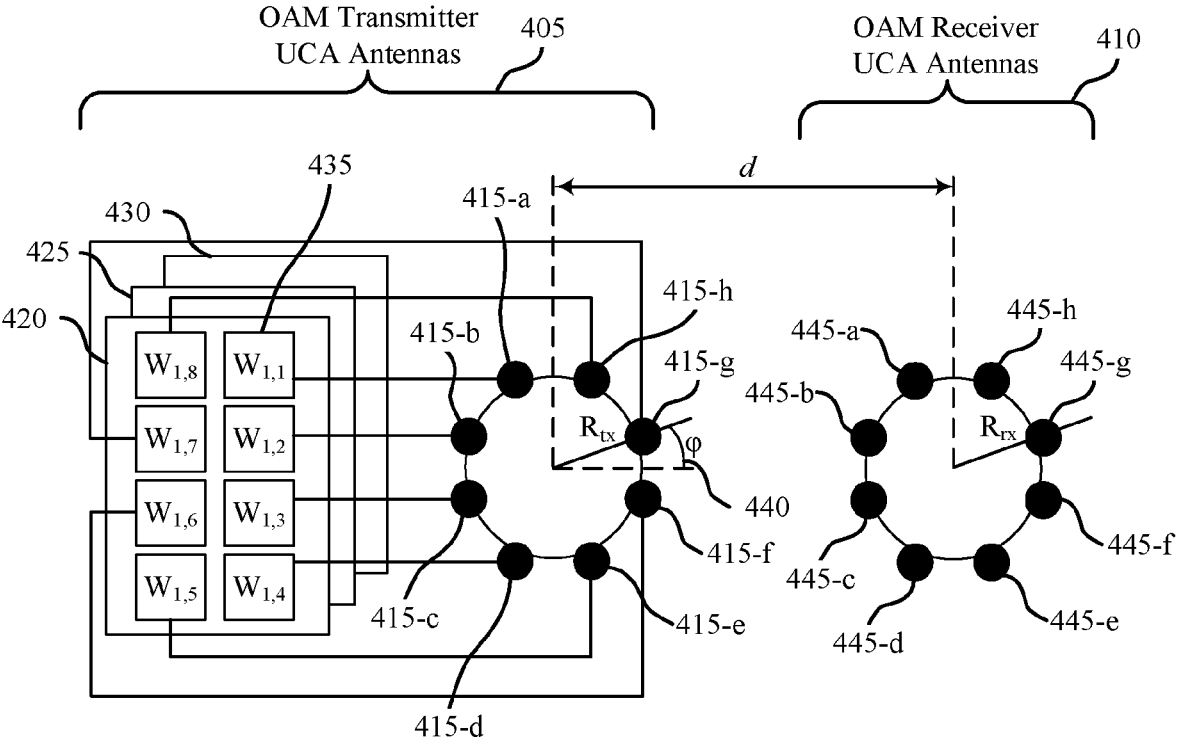
FIG. 4 illustrates an example of a uniform circular array orbital angular momentum configuration that supports multi-mode PMI report for OAM based communication system in accordance with aspects of the present disclosure.

In some aspects, an as described with respect to FIG. 4, the first device 205-a, or the second device 210-a, or both may be configured with a set of antennas configured in a circle, such as a UCA antenna circle (e.g., antenna circle, transmitter circle, circular array). In some cases, the first device 205-a and the second device 210-a may each be equipped with one or more UCA circles that the first device 205-a and the second device 210-a may use to communicate according to one or more OAM modes. In scenarios in which the first device 205-a, or the second device 210-a, or both each are equipped with multiple UCA circles, the efficiency of each UCA circle (e.g., the channel gain of signals from each UCA circle) may be different for each OAM mode. For example, a signal produced by a first antenna circle according to a first OAM mode may have a different channel gain than a signal produced by a second antenna circle according to the first OAM mode. In some aspects, a transmitting device (e.g., the first device 205-a, the second device 210-a) may radiate multiple coaxially propagating, spatially-overlapping waves (OAM mode l=−∞, . . . , −2, −1, 0, +1, +2, . . . , +∞) each carrying a data stream through a pair of apertures or an array of apertures.

In some examples, the position and direction of second device 210-a and first device 205-a using OAM communications may be fixed and the surrounding environment may be static (e.g., channel conditions may not vary more than threshold amount). In such examples, the channel status of the link between the second device 210-a and the first device 205-a may not change after an initial connection setup. However, there may instances where the second device 210-a and/or the first device 205-a may move (e.g., due to vibration by wind or another influence) by enough (e.g., at or above 0.01 degrees) that the inter-mode interference strength among the antenna circles (e.g., among circular arrays) may change by above a threshold amount. Additionally or alternatively, the environment between the second device 210-a and the first device 205-a may be variable and may influence propagation of a wave between the second device 210-a and first device 205-a and may thus enable a change in the channel status between the second device 210-a and the first device 205-a.

To account for changes in the channel status, the first device 205-a may indicate the channel status in a report 220 (e.g., a CSI report) to the second device 210-a via communications link 225-a. For instance, the second device 210-a a may transmit, to the first device 205-a, one or more reference signals according to each OAM mode and using each UCA circle, resulting in one or more reference signals being transmitted over an OAM mode and UCA circle pairing (e.g., pair, combination). The second device 210-a may transmit the reference signals via communications link 225-b. The first device 205-a may receive one or more of the reference signals, perform measurements (e.g., channel gain, RSRP, SNR, RSRQ) on each of the received reference signals and may generate a report 220 (e.g., a CSI report) to transmit to the second device 210-a that indicates a status of the channel between the first device 205-a and the second device 210-a.

In some examples, the report 220 may include PMI that may indicate to the second device 210-a information that the second device 210-a may use to generate a precoding matrix for each OAM mode. For instance, in a multi-circle (e.g., multiple antenna circles) multi-mode OAM communication, signals of multiple layers and multiple OAM modes may be transmitted at each antenna circle. The signals transmitted at each circle may be the sum of the signals of multiple layers and multiple modes. In a per-circle implementation (e.g., a per-circle perspective), first device 205-a may determine the transmitted signal for a particular antenna circle as $x_i = \Sigma_m f_m \Sigma_l \tilde{w}_{i,m,l} s_{m,l}$, where i may be the index of an antenna circle, $f_m$ may be a generation vector for OAM mode m, $\tilde{w}_{i,m,l}$ may be a precoding weight (e.g., for a particular antenna circle index i, OAM mode m, and layer l), and $s_{m,l}$ may be data which is common to each antenna circle in the array of concentric antenna circles. For different OAM generation methods, $f_m$ may be generated differently. For UCA-based OAM, $f_m$ may be an mth discrete fourier transform (DFT) vector and for SSP-based OAM, $f_m$ may be generated according to an angular slope of a signal passing through SPP-based aperture (e.g., $f_m$ may be generated by making the signal through the SPP with a corresponding angular slope). The PMI reported by the first device 205-a may include an amplitude and/or phase of $\tilde{w}_{i,m,l}$.

In some examples, first device 205-a may generate an individual PMI report for each OAM mode. However, as the number of OAM modes (e.g., $N_{mode}$, where $0 \le m \le N_{mode}$) and/or the number of antenna circles (e.g., $N_{tx}$, $0 \le i \le N_{tx}$) increase, the overhead associated with transmitting the individual PMI reports may increase. For instance, the number of weights $\tilde{w}_{i,m,l}$ (e.g., the number of amplitudes and phases of $\tilde{w}_{i,m,l}$) to be reported in each PMI report and/or the number of individual PMI reports may increase. Accordingly, as the number of OAM modes and the number of antenna circles increase, the weights $\tilde{w}_{i,m,l}$ may consume (e.g., take up) a larger number of quantization bits. Examples in which the number of OAM modes may be increased may include examples in which a radius of the set of concentric circular antennas is increased and/or examples in which an increased carrier frequency (e.g., terahertz or sub-terahertz) is employed. Examples in which the number of antenna circles may be increased may include examples in which an increased carrier frequency (e.g., terahertz or sub-terahertz) is employed, as an increased number of co-axial circles may be used to increase beamforming gains and/or extend coverage. If the precoding codeword of each OAM mode is individually reported, the signaling overhead may be large enough to consume excessive radio resources (e.g., above a threshold number) and may decrease system throughput (e.g., below a threshold amount).

The techniques described herein may enable PMI to be conveyed to the second device 210-$a$ with decreased overhead. In some examples, the first device 205-$a$ may generate a report 220 (e.g., a CSI report) that includes the precoding vectors of each OAM mode. For instance, the precoding weights may be jointly reported with a common part (e.g., a part common to all OAM modes) and a group of individual parts (e.g., parts specific to each OAM mode). In this manner, the PMI may be organized in a per-mode perspective (e.g., instead of a per-antenna-circle perspective).

In some examples, a signal transmitted from an antenna circle i may be represented as $x_i = \Sigma_m f_m \Sigma_l \tilde{w}_{i,m,l} s_{m,l}$, where m may be an index of an OAM mode, l may be an index of a layer, i may be the index of antenna circle, $\tilde{w}_{i,m,l}$ may be a precoding weight, $s_{m,l}$ may be transmitted data common to each antenna circle, and $f_m$ may be a generation vector for mode m. In some examples, for different OAM generation methods, $f_m$ may be generate differently. For instance, for UCA-based OAM, $f_m$ may be the mth DFT vector and for SPP-based OAM, $f_m$ may be generated by using the signal through the SPP with a corresponding angular slope. In some examples, as the number of OAM modes (e.g., $N_{mode}$, where $0 \le m \le N_{mode}$) and/or the number of antenna circles (e.g., $N_{tx}$, $0 \le i \le N_{tx}$) increase, the overhead associated with transmitting the individual PMI reports may increase. For instance, the number of weights $\tilde{w}_{i,m,l}$ (e.g., the number of amplitudes and phases of $\tilde{w}_{i,m,l}$) to be reported in each PMI report and/or the number of individual PMI reports may increase. Accordingly, as the number of OAM modes and the number of antenna circles increase, the weights $\tilde{w}_{i,m,l}$ may consume (e.g., take up) a larger number of quantization bits.

Accordingly, first device 205-$a$ may indicate a weight different than $\tilde{w}_{i,m,l}$. For instance, for OAM mode m, the equivalent channel gain g from an antenna circle i of the transmitting device to an antenna circle j of the receiving device may be equal to $$g_{m,j,i} = f_m^H H_{j,i} f_m,$$

where $H_{j,i}$ may be a physical channel matrix between antennas of transmitting device antenna circle i and receiving device antenna circle j. Accordingly, for mode m, the equivalent channel matrix between transmitting device antenna circles and receiving device antenna circles may be $$G_m = \begin{bmatrix} g_{m,1,1} & \cdots & g_{m,1,N_{tx}} \\ \vdots & \ddots & \vdots \\ g_{m,N_{rx},1} & \cdots & g_{m,N_{rx},N_{tx}} \end{bmatrix} =$$

$$\begin{bmatrix} f_m^H & \cdots & 0 \\ \vdots & \ddots & \vdots \\ 0 & \cdots & f_m^H \end{bmatrix} \begin{bmatrix} H_{1,1} & \cdots & H_{1,N_{tx}} \\ \vdots & \ddots & \vdots \\ H_{N_{rx},1} & \cdots & H_{N_{rx},N_{tx}} \end{bmatrix} \begin{bmatrix} f_m & \cdots & 0 \\ \vdots & \ddots & \vdots \\ 0 & \cdots & f_m \end{bmatrix},$$

where $N_{tx}$ may be a total number of transmitting device antenna circles and $N_{rx}$ may be a total number of receiving device antenna circles.

Generally, $$\tilde{H} \triangleq \begin{bmatrix} H_{1,1} & \cdots & H_{1,N_{tx}} \\ \vdots & \ddots & \vdots \\ H_{N_{rx},1} & \cdots & H_{N_{rx},N_{tx}} \end{bmatrix}$$

may correspond to a part that is common to each OAM mode, whereas $$\tilde{f}_m = \begin{bmatrix} f_m & \cdots & 0 \\ \vdots & \ddots & \vdots \\ 0 & \cdots & f_m \end{bmatrix} \text{ and } \tilde{f}_m^H = \begin{bmatrix} f_m^H & \cdots & 0 \\ \vdots & \ddots & \vdots \\ 0 & \cdots & f_m^H \end{bmatrix}$$

may correspond to parts that are specific to each OAM mode. Accordingly, the receiving device may report a common component precoding matrix (e.g., $W_{com}$) for the OAM modes that is related to (e.g., is associated with, derived from) $\tilde{H}$ and an individual component precoding matrix for each mode (e.g., $W_{ind,m}$) that is related to (e.g., associated with, derived from) $f_m$ and/or $$f_m^H.$$

For instance, the reported precoding weight matrix for OAM mode m may be expressed as $W_m = W_{com} * W_{ind,m} \in \mathbb{C}^{N_{tx} \times N_{layer,m}}$, where $W_{com} \in \mathbb{C}^{N_{tx} \times L}$ and $\{W_{ind,m} \in \mathbb{C}^{L \times N_{layer,m}}\} m = 1 \sim N_{mode}$ or $\{W_{ind,m} \in \mathbb{C}^{L \times N_{layer,m}}\} m = 0 \sim N_{mode}$. In some such examples, $W_{com}$ and $W_{ind,m}$ may be quantized and reported, where the parameter L may control a dimension of $W_{com}$ and an accuracy of the PMI in effect. In some examples, $N_{layer,m}$ (e.g., where $N_{layer,m} \le N_{tx}$) may be the number of layers for data transmission which are transmitted at OAM mode m. The data may be transmitted by some or each antenna circle of the set of concentric antenna circles. In examples where $L < N_{tx}$ (e.g., $L << N_{tx}$), the signaling overhead of joint reporting $W_{com}$ and $W_{ind,m}$ may be reduced compared with individually reporting $W_m$ for each OAM mode.

In a first portion (e.g., the first part) of PMI, the first device 205-$a$ may include parameters associated with $W_{com}$. For instance, the first device 205-$a$ may generate (e.g., estimate) $W_{com}$ based on $G_m$. For instance, $W_{com}$ may use L singular vectors of $$\sum_{m=1}^{N_{layer}} G_m^H G_m$$

with the largest singular values, smallest singular values, or singular values that satisfy another metric. The first device 205-$a$ may report the amplitudes of $W_{com}$, the phases of $W_{com}$, the indexes of codewords which emulate $W_{com}$ out of a codebook (e.g., a pre-defined codebook), or any combination thereof.

In a second portion of PMI (e.g., the second part of the PMI), the first device 205-$a$ may include parameters associated with $W_{ind,m}$. For instance, based on the estimated gain matrix $G_m$ and the calculated common component precoding matrix $W_{com}$, the per-mode individual component precoding matrices $W_{ind,m}$ may be calculated and reported in the second portion of the PMI. In some examples, the per-mode weight may be mapped to a per-circle weight. For instance, in some examples, $\tilde{w}_{i,m,l} = (W_m)_{i,l}$.

In some examples, first device 205-a may generate PMI according to the methods described herein. For instance, there may be $N_{tx}$ transmitter antenna circles (e.g., where $i=1\sim N_{tx}$), $N_{mode}$ OAM modes (e.g., where $m=1\sim N_{mode}$ or $0\sim N_{mode}$), and $N_{layer}$ layers (e.g., where $l=1\sim N_{layer}$). In some examples, first device 205-a may determine per-circle precoding weights $\{\tilde{w}_{i,m,l}\}$. In other examples, first device 205-a may determine per-mode precoding weights $W_m$. For instance, first device 205-a may estimate each $G_m$ based on received reference signals for OAM mode m. In some examples, first device 205-a may estimate $$G_m \text{ as } \begin{bmatrix} f_m^H & \cdots & 0 \\ \vdots & \ddots & \vdots \\ 0 & \cdots & f_m^H \end{bmatrix} \begin{bmatrix} H_{1,1} & \cdots & H_{1,N_{tx}} \\ \vdots & \ddots & \vdots \\ H_{N_{rx},1} & \cdots & H_{N_{rx},N_{tx}} \end{bmatrix} \begin{bmatrix} f_m & \cdots & 0 \\ \vdots & \ddots & \vdots \\ 0 & \cdots & f_m \end{bmatrix}.$$

After estimating $G_m$, first device 205-a may calculate $W_{com}$ based on the calculated $\{G_m\}$ for each OAM mode. After calculating $W_{com}$, first device 205-a may calculate $W_{ind,m}$ based on the calculated $W_{com}$ and $G_m$ for each OAM mode m. For instance, first device 205-a may calculate inter-circle precoding matrix $W_0$ (e.g., $W_{ind,0}$) for mode 0 using $G_0$ and $W_{com}$; inter-circle precoding matrix $W_1$ (e.g., $W_{ind,1}$) for mode 1 using $G_1$ and $W_{com}$; inter-circle precoding matrix $W_2$ (e.g., $W_{ind,2}$) for mode 2 using $G_2$ and $W_{com}$; and so on. In some examples, each mode may correspond to two or more antenna circles of concentric antenna circles.

In some examples, performing the methods described herein may be associated one or more advantages. For instance, the methods described herein may reduce PMI report overhead in multi-circle multi-mode OAM communication. For instance, individual reporting $\{\tilde{w}_{i,m,l}\}$ for each transmitting circle, each OAM mode, and each layer may have a number of weights equal to $N_{mode}N_{tx}N_{layer}$. However, joint reporting according to the methods described herein (e.g., reporting $W_{com}$ and $\{W_{ind,m}\}m=_{1\sim M}$) may have a number of weights equal to $N_{tx}L+N_{mode}N_{layer}L$. In some examples $(N_{tx}L+N_{mode}N_{layer}L)\leq N_{mode}N_{tx}N_{layer}$. In examples where $L<N_{tx}$ (e.g., $L<<N_{tx}$), the reporting overhead may be reduced for joint reporting as compared to individual reporting (e.g., regardless of reporting amplitudes and phases of precoding weights or reporting codewords used to emulate weight vectors).

In some examples, second device 210-a may transmit a reference signal (e.g., a channel state information (CSI) reference signal (CSI-RS)) per mode per circle to first device 205-a. Additionally, second device 210-a may transmit a configuration 215 (e.g., a CSI report configuration) including parameters (e.g., CSI report parameters, such as a list of OAM modes whose PMIs are jointly reported, a maximum quantity of OAM modes for simultaneous transmission, and other related PMI parameters). In some examples, the configuration 215 (e.g., CSI report configuration) received by first device 205-a (e.g., from second device 210-a) may include a list of OAM modes with size $N_{mode}$, a list of transmitter circles with size $N_{tx}$, a dimension L of a common component precoding matrix (e.g., $W_{com}$), a maximum quantity of OAM modes for simultaneous transmission, or any combination thereof.

In some examples, first device 205-a may receive the configuration 215 and may determine a rank of a precoding matrix for one or more OAM modes based on receiving the configuration 215. For example, the configuration 215 may include an indication of a maximum quantity of OAM modes for simultaneous transmission. In some examples, first device 205-a may receive the configuration 215 and determine the rank of the precoding matrix for one or more OAM modes based on the maximum quantity of OAM modes for simultaneous transmissions. For example, if a maximum quantity of simultaneous OAM modes for a transmit circle, i, is $n_i$, where $i=1\sim K$, a total rank for all OAM modes may not be greater than $$\sum_{i=1}^{K} n_i.$$

Additionally or alternatively, a rank of OAM mode j using transmit circles $\{i_{j,1}, i_{j,2}, \ldots i_{j,K_j}\}$ may not be greater than the maximum value of $$\left\{ n_{i_{j,1}}, n_{i_{j,2}}, \ldots, n_{i_{j,K_j}} \right\}.$$

First device 205-a may generate multi-mode PMI and may transmit a report 220 (e.g., a CSI report) including a joint report of the PMI for each mode (e.g., including multi-circle precoding weights of each configured mode). In some examples, the report 220 may include a quantization result of a common component precoding matrix (e.g., $W_{com}$), a number of layers $N_{layer,m}$ for each OAM mode, or a quantization result of individual component precoding matrices $\{W_{ind,m}\}_{m=1\sim M}$ for each OAM mode. In some examples, second device 210-a may transmit a data transmission to first device 205-a based on the reported per-mode precoding weights.

In some examples, per-circle feedback (e.g., $\{\tilde{w}_{i,m,l}\}$) may be reported in addition to per-mode feedback (e.g., before, after, or interleaved with per-mode feedback). For instance, if a transmit power of the transmitter circles is to be reallocated or readjusted (e.g., such as when the first device 205-a or second device 210-a moves, or when an object comes in or out of view), first device 205-a may report per-circle feedback. In some examples, orthogonal modes may correspond to discrete Fourier transform (DFT) vectors for different angular directions and may also correspond to DFT vectors along a radial direction. To achieve orthogonality in such examples, multiple transmitter circles may be used for each mode and power among these transmitter circles for each mode may be reallocated. If power is only reallocated across modes, first device 205-a may, in some examples, transmit per-mode feedback (e.g., parameters associated with $W_{com}$ and $\{W_{ind,m}\}_{m=1\sim M}$) instead of per-circle feedback.

In some examples, (e.g., according to the Green function), the signal at a receiver plane v may be written or defined as a function of transmitter signal u as $$v = \int \int \int u \frac{\exp(jkr)}{r} \psi dS,$$

where $\gamma=\cos\theta$ or another function of an angle of propagation (e.g., a function close to $\cos\theta$). In some examples, $\psi\approx1$. The integral may not correspond to a solution form when transceivers are discrete units. Eigen modes may be found by singular value decomposition (SVD) of a transfer matrix (e.g., the Gaussian term may be present in the eigen vectors).

If there are N transmitting and N receiving antennas, the transfer matrix H may be approximated as (e.g., found as)

$$H_{m,n} \propto \frac{\exp\left(jk\sqrt{z^2 + (r_1\cos\theta_1 - r_2\cos\theta_2)^2 + (r_1\sin\theta_1 - r_2\sin\theta_2)^2}\right)}{\sqrt{z^2 + (r_1\cos\theta_1 - r_2\cos\theta_2)^2 + (r_1\sin\theta_1 - r_2\sin\theta_2)^2}} =$$

$$\frac{\exp\left(jk\sqrt{z^2 + r_1^2 + r_2^2 - 2r_1r_2\cos(\theta_1 - \theta_2)}\right)}{\sqrt{z^2 + r_1^2 + r_2^2 - 2r_1r_2\cos(\theta_1 - \theta_2)}}.$$

In some examples, $r_1$ may correspond to a radius of a first circular array, $r_2$ may correspond to a radius of a second circular array, $\theta_1$ may correspond to an angle of the first circular array, and $\theta_2$ may correspond to an angle of the second circular array.

In some examples, transfer matrix H may be cyclic. In some such examples, its eigenvectors may be DFT vectors. For instance, $$v_\mu = \exp\left\{j\frac{2\pi\mu v}{N}\right\},$$

$\mu=0, 1, \ldots (N-1), v=0, 1, \ldots (N-1)$, where $\mu$ may be a vector index of a DFT vector and $v$ may be an element index in each DFT vector. In some examples, the y-th DFT vector may correspond to (e.g., be an example of) a $\mu$-th OAM waveform. According to an orthogonality property, with N transmitter and receiver antennas, each of OAM modes 0, 1, ... (N−1) may be orthogonal at the receiver if any of them are transmitted (e.g., regardless of a distance z and a radii of the transmitter and receiver circles). Accordingly, per-mode channel estimation (e.g., $W_{com}$, and $\{W_{ind,m}\}_{m=1\sim M}$) and feedback may be used in place of per-antenna pair or per circle feedback (e.g., $\{\tilde{w}_{i,m,l}\}$). In order for a transmitter and receiver to be aligned, both transmitter and receiver planes may be co-axial and vertical to a z-axis. In some examples, the transmitter and receiver antennas may have an angular offset.

The mode response (e.g., strength) of each receiver circle (e.g., each receiver circular array) may be described herein. According to a Taylor expansion approximation:

$$\sqrt{z^2 + r_1^2 + r_2^2 - 2r_1r_2\cos(\theta_1 - \theta_2)} =$$

$$z\sqrt{1 + \frac{r_1^2 + r_2^2 - 2r_1r_2\cos(\theta_1 - \theta_2)}{z^2}} \approx z\left(1 + \frac{r_1^2 + r_2^2 - 2r_1r_2\cos(\theta_1 - \theta_2)}{2z^2}\right) =$$

$$z + \frac{r_1^2 + r_2^2}{2z} - \frac{2r_1r_2\cos(\theta_1 - \theta_2)}{z}.$$

Accordingly, $$H_{m,n} \propto \frac{\exp\left(jk\sqrt{z^2 + (r_1\cos\theta_1 - r_2\cos\theta_2)^2 + (r_1\sin\theta_1 - r_2\sin\theta_2)^2}\right)}{\sqrt{z^2 + (r_1\cos\theta_1 - r_2\cos\theta_2)^2 + (r_1\sin\theta_1 - r_2\sin\theta_2)^2}} \approx$$

$$\frac{\exp\left\{jkz\sqrt{1 + \frac{r_1^2 + r_2^2 - 2r_1r_2\cos(\theta_1 - \theta_2)}{z^2}}\right\}}{+\frac{r_1^2 + r_2^2}{2z} - \frac{2r_1r_2\cos(\theta_1 - \theta_2)}{z}} \approx$$

$$\frac{\exp\left\{jk\left(z + \frac{r_1^2 + r_2^2}{2z^2}\right)\right\}}{z}\exp\left\{-\frac{jkr_1r_2\cos(\theta_1 - \theta_2)}{z}\right\}.$$

In some examples (e.g., assuming $\theta_1=0$ and $\theta_2=\theta$ and ignoring common terms among receiver antennas)

$$H_{m,n} \propto \exp\left\{\left\{-\frac{jkr_1r_2\cos(\theta)}{z}\right\} = \exp\left\{-j2\pi\frac{r_1r_2\cos(\theta)}{\lambda z}\right\}\right\},$$

$$\theta = 0, \frac{2\pi}{N}, \ldots, \frac{2(N-1)\pi}{N}.$$

Accordingly, the critical term may be $$\exp\left\{-j2\pi\frac{r_1r_2\cos(\theta)}{\lambda z}\right\}.$$

When, $$\frac{r_1r_2}{\lambda z} \ll 1, \exp\left\{\left\{-\frac{jkr_1r_2\cos(\theta)}{z}\right\} \approx 1 - j2\pi\frac{r_1r_2\cos(\theta)}{\lambda z}\right.$$

and may act similar to or be an example of a low pass filter. If $$\frac{r_1r_2}{\lambda z} \gg 1, \exp\left\{-j2\pi\frac{r_1r_2\cos(\theta)}{\lambda z}\right\}$$

may be oscillatory (e.g., highly oscillatory). The spatial dimension with respect to wavelength may be given as $$\frac{r_1r_2}{\lambda z}.$$

For a particular receiver circle, its response to OAM modes may depend on geometric sizes and wavelength.

Further, although shown as the first device 205-*a* transmitting an OAM transmission and the second device 210-*a* transmitting the communication parameters, the first device 205-*a* or the second device 210-*a*, or both, may transmit or receive an OAM transmission (e.g., OAM beam) to or from each other, or other wireless devices, such as peer devices. For example, the first device 205-*a* may be a network entity and the second device 210-*a* may be a network entity, or the first device 205-*a* may be a UE and the second device 210-*a* may be a UE. In another example, the first device 205-*a* may be a network entity and the second device may be a UE, or vice versa. Additionally, or alternatively, techniques as discussed herein may be used in communications between UEs, network entities, IAB nodes, relay nodes, access points, other wireless devices, or any combinations thereof.

Although the present example describes first device 205-*a* transmitting the report and second device 210-*a* transmitting the configuration there may be examples where first device 205-*a* may transmit the configuration to second device 210-*a*. Additionally or alternatively, there may be examples where second device 210-*a* transmits the report to first device 205-*a*.

Figure 3:
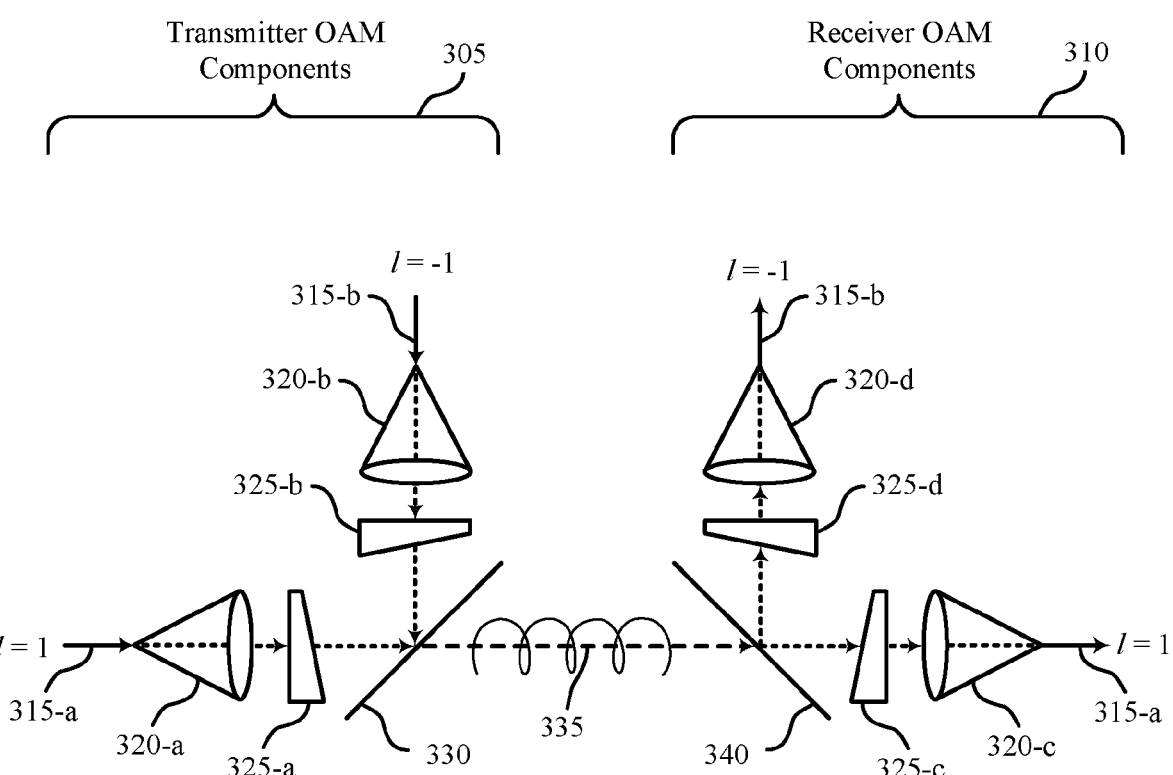
FIG. 3 illustrates an example of a spiral phase plate orbital angular momentum configuration that supports multi-mode PMI report for OAM based communication system in accordance with aspects of the present disclosure.

FIG. 3 illustrates an example of an SPP OAM configuration 300 that supports multi-mode PMI report for OAM based communication system in accordance with aspects of the present disclosure. In some examples, SPP OAM configuration 300 may implement aspects of wireless communications system 100 or 200. In this example, a transmitting device (e.g., UE or network entity) may include transmitter OAM components 305 and a receiving device (e.g., UE or network entity) may include receiver OAM components 310.

In cases in which the wireless devices use an SPP methodology, the transmitting device may convert an electromagnetic wave 315 associated with an OAM mode index $l=0$ (e.g., a non-helical electromagnetic wave associated with mode-zero OAM) into an electromagnetic wave associated with an OAM mode index $l\neq0$ (e.g., a helical electromagnetic wave associated with non-zero OAM mode) based on passing the electromagnetic wave through an aperture 320 and an SPP 325. Such an SPP 325 may be associated with geometric constraints and may be able to generate an electromagnetic wave associated with a single OAM mode. Thus, the wireless device may use one SPP 325 to generate one OAM mode of an OAM beam 335. As such, a wireless device may implement a different SPP 325 for each OAM mode of an OAM beam 335.

The example of FIG. 3 illustrates the use of two OAM modes (e.g., $l=+1$ and $-1$). In the transmitter OAM components, a first electromagnetic wave 315-a may be provided to a first aperture 320-a and a first SPP 325-a (also referred to herein as a transmitter aperture and a transmitter SPP), and a second electromagnetic wave 315-b may be provided to a second aperture 320-b and a second SPP 325-b (also referred to herein as a transmitter aperture and a transmitter SPP). A beam splitter/combiner 330 may combine the output of the first SPP 325-a and the second SPP 325-b to generate OAM beam 335. The receiver OAM components 310 may receive the OAM beam 335 at a beam splitter/combiner 340, which may provide instances of the OAM beam 335 to a third SPP 325-c and a fourth SPP 325-d (also referred to herein a receiver SPPs). The third SPP 325-c and the fourth SPP 325-d may provide output to a first receiver aperture 320-c and a second receiver aperture 320-d (also referred to herein as a receiver apertures), respectively.

The third SPP 325-c may have geometric constraints corresponding to the first SPP 325-a and thus the output of the first receiver aperture 320-c may correspond to the first electromagnetic wave 315-a (e.g., for OAM Mode $l=1$). Likewise, the fourth SPP 325-d may have geometric constraints corresponding to the second SPP 325-b and thus the output of the second receiver aperture 320-d may correspond to the second electromagnetic wave 315-b (e.g., for OAM Mode $l=2$). In devices that use SPP methodology, separate SPPs 325 may be used for each OAM mode, and the number of usable OAM modes may correspond to the number of SPPs 325 at a device. As discussed, wireless devices may also use a UCA methodology for OAM communications, an example of which is discussed with reference to FIG. 4.

FIG. 4 illustrates an example of a UCA OAM configuration 400 that supports multi-mode PMI report for OAM based communication system in accordance with aspects of the present disclosure In some examples, UCA OAM configuration 400 may implement aspects of wireless communications system 100 or 200. In this example, a transmitting device (e.g., UE or network entity) may include OAM transmitter UCA antennas 405 and a receiving device (e.g., UE or network entity) may include OAM receiver UCA antennas 410.

In some aspects, one or both of the OAM transmitter UCA antennas 405 or the OAM receiver UCA antennas 410 may be implemented as a planar array of antenna elements which may be an example of or otherwise function as a (massive or holographic) MIMO array or an intelligent surface. In some cases, the transmitting device may identify a set of antenna elements 415 of the planar array that form a transmitter UCA, and a receiving device may identify a set of antenna elements 445 of the planar array that form a receiver UCA.

Upon selecting the set of antenna elements from the planar array, the OAM transmitter may apply a weight 435 to each of the selected antenna elements 415 based on the OAM mode index l of the transmitted OAM beam and one or more spatial parameters associated with each antenna element. In cases in which UCA methodology is used to generate an OAM beam, the transmitting device may identify the set of antenna elements 415 on a circular array of antenna elements and may load a first set of weights 420 to each of the identified antenna elements based on a first OAM mode index (e.g., $l=0$). Further, for other OAM mode indices, other weights may be used for the set of antenna elements 415, such as a second OAM mode index (e.g., $l=+1$) that may use a second set of weights 425 and a third OAM mode index (e.g., $l=-1$) that may use a third set of weights 430.

For example, to generate an OAM beam with an OAM mode index (e.g., $l=0$), the OAM transmitter may load a weight 435 to each antenna element 415 on the UCA based on an angle 440 measured between a reference line on the UCA (e.g., the x-axis of the plane on which the UCA is located, where the origin is at the center of the UCA) and the antenna element, the OAM mode index l, and i (e.g., for complex-valued weights, which may alternatively be denoted as j in some cases). In some cases, for instance, the weight for an antenna element n may be proportional to $e^{i*l*\varphi_n}$, where $\varphi_n$ is equal to the angle 440 measured between the reference line on the UCA and the antenna element n. By multiplying respective beamforming weights 435 of each set of weights 420 through 430 (e.g., for the first set of weights 420, $w_1=[w_{1,1}, w_{1,2}, \ldots, w_{1,8}]^T$) onto each antenna, a signal port (also referred to herein as an OAM-formed port) may be generated. If the weight 435 of each antenna element 415 is equal to $e^{i\varphi l}$, where $\varphi$ is the angle of antenna element 415 in the circle (e.g., angle 440 for antenna element 415-g), and l is the OAM mode index, then each set of weights 420 through 430 provides a beamformed port that is equivalent OAM mode l. By using different beamforming weights $e^{i\varphi l'}$, where $l'\neq1$, multiple OAM modes may be generated.

At the OAM receiver UCA antennas 410, the receiving device may include antenna elements 445 (also referred to herein as receive antenna elements) equipped in a circle. The channel matrix may be denoted from each transmit antenna to each receive antenna as H, and for the beamformed channel matrix $\tilde{H}=H\cdot[w_1, w_2, \ldots, w_L]$, any two columns of $\tilde{H}$ are orthogonal which means the beamformed ports have no crosstalk.

Accordingly, OAM-based communication may realize high-level spatial multiplexing degrees efficiently. Further, the eigen-based transmit precoding weights and receive combining weights of UCA-based OAM are effectively equal to a discrete Fourier transform (DFT) matrix, which is relatively independent of communication parameters (e.g., distance, aperture size and carrier frequency), and thus UCA-based OAM may be implemented at relatively low cost.

In some systems, for single-circle UCA-based OAM performance, performance parameters such as OAM multiplexing degree and throughput may be based on parameter settings associated with the UCA, such as a radius of a UCA and an operating frequency. For example, a larger radius may support a relatively higher OAM multiplexing degree. In some examples, a higher operating frequency may support a relatively higher OAM multiplexing degree. In some cases, parameter settings such as a relatively large radius and high frequency may support a relatively large number of used OAM modes (e.g., multiple tens).

FIG. 5 illustrates an example of a multi-circle UCA-based OAM configuration 500 that supports multi-mode PMI report for OAM based communication in accordance with aspects of the present disclosure. In some examples, multi-circle UCA-based OAM configuration 500 may implement aspects of wireless communications system 100 or 200. In this example, a transmitting device (e.g., UE, network entity, a first device) may include OAM transmitter UCA antennas 505 and a receiving device (e.g., UE, network entity, a second device) may include OAM receiver UCA antennas 510.

As described with reference to FIG. 4, device may be configured with a UCA antenna to realize OAM-based communications. In some implementations, a device may be configured with multiple UCA antenna circles 515 (also referred to herein as UCA circles 515). For example, a transmitting device and a receiving device may each be configured with multiple co-axis UCA antenna circles 515 (also referred to herein as UCA circles 515). A transmitting device may be configured with OAM transmitter UCA antennas 505 and a receiving device may be configured with OAM receiver UCA antennas 510. A transmitting device and a receiving device may be configured with the same number of UCA circles 515, or a different number of UCA circles. In the example depicted by FIG. 5, a transmitting device and a receiving device may each be configured with five antenna circles, where each antenna circle may include one or more antenna elements 530. Each UCA circle 515 may include any number of antenna elements 530.

Further a device may be configured with UCA circles 515 (e.g., UCA circles 515-*a* through 515-*e*) at a transmitter of the device, and the same device may be configured with UCA circles 515 (e.g., UCA circles 515-*f* through 515-*j*) at a receiver of the device. For example, a transmitting device (e.g., second device 210-*a* a as described with reference to FIG. 2) may be configured with UCA circles 515-*a*, 515-*b*, 515-*c*, 515-*d*, and 515-*e* (also referred to herein as downlink transmitter circles of the transmitting device), and the receiving device (e.g., a first device 205-*a* as described with reference to FIG. 2) may be configured with UCA circles 515-*f* through 515-*j* (also referred to herein as downlink receiver circles of the receiving device) at a receiver of the receiving device. In some examples, UCA circles 515-*a*, 515-*b*, 515-*c*, 515-*d*, and 515-*e* may be configured to receive transmissions (e.g., uplink transmissions), and UCA circles 515-*f* through 515-*j* may be configured to transmit transmissions (e.g., uplink transmissions).

In some examples, a transmitting device may be configured with UCA circles 515-*a*, 515-*b*, 515-*c*, 515-*d*, and 515-*e* (also referred to herein as downlink transmitter circles), where the number of antenna elements 530 included on each UCA circle 515 may be the same, different, or partially the same. In some examples, the receiving device may be configured with UCA circles 515-*f*, 515-*g*, 515-*h*, 515-*i*, and 515-*j* (also referred to herein as downlink receiver circles), where the number of antenna elements 530 included on each of the UCA circles 515-*f*, 515-*g*, 515-*h*, 515-*i*, and 515-*j* may be the same, different, or partially the same.

For example, all UCA circles 515 may include the same number of antenna elements 530, or each UCA circle 515 may include a different number of antenna elements 530, or a subset of the UCA circles 515 may include the same number of antenna elements 530. In some cases, the number of antenna elements 530 included on each UCA circle 515 may be based on the radius of the UCA circle 515. Each of the UCA circles 515 that a device is configured with may have the same radius, or different radii, or some may be the same and some may be different. The UCA circles 515 a device is configured with may be configured in any orientation. For example, the UCA circles may each have a different radius and be interlaid (e.g., concentrically), such that one UCA circle 515 sits inside another UCA circle 515, and so on, as depicted in FIG. 5.

In some cases, intra-circle OAM transmissions (e.g., OAM signals, OAM streams) may be orthogonal to each other, such that OAM transmissions from the same UCA circle 515 may not interfere with one another. As such, OAM transmissions from the same UCA circle 515 of different OAM states or modes may be multiplexed together to increase the capacity of an OAM link. In some cases, inter-circle OAM transmissions (e.g., OAM signals, OAM streams) may be orthogonal with different OAM modes, such that OAM transmissions from different UCA circles 515 transmitted according to different OAM modes may be orthogonal to one another. Inter-circle OAM transmissions may be non-orthogonal with OAM transmissions of the same OAM mode, such that OAM transmissions from different UCA circles 515 transmitted according to the same OAM mode may be non-orthogonal to one other (e.g., cause interference to another other, cause cross-talk). For each OAM mode, inter-circle interference may exist where the OAM transmissions stream from one UCA circle 515 is mutually interfered with the OAM transmission stream transmitted from another UCA circle 515, where the two OAM transmission streams have the same OAM mode.

For example, multiple OAM transmissions may be transmitted from each UCA circle 515, where the intra-circle transmissions may be multiplexed if the intra-circle transmissions are associated with different modes. For example, a transmitting device may transmit a first OAM transmission according to OAM mode 1 via UCA circle 515-*e*, and a second OAM transmission according to OAM mode 2 via UCA circle 515-*e*. The transmitting device may transmit a third OAM transmission according to OAM mode 1 via UCA circle 515-*d*, a fourth OAM transmission according to OAM mode 2 via UCA circle 515-*d*, a fifth OAM transmission according to OAM mode 1 via UCA circle 515-*c*, a sixth OAM transmission according to OAM mode 2 via UCA circle 515-*c*, a seventh OAM transmission according to OAM mode 1 via UCA circle 515-*b*, and an eighth OAM transmission according to OAM mode 2 via UCA circle 515-*b*. The transmitting device may transmit one or more OAM transmissions according to one or more OAM modes via UCA circle 515-*a*.

In some aspects, the transmitting device may transmit an OAM transmission according to an OAM mode 0, for example, by using the same weight (e.g., a weight of one) for all antenna elements 530 of a UCA circle 515 (e.g., UCA circle 515-*b*) of the transmitting device. In some other aspects, the transmitting device may transmit an OAM transmission according to OAM mode 0 by using the same weight (e.g., a weight of one) for all antenna elements 530 of multiple UCA circles (e.g., UCA circle 515-*b* and UCA circle 515-*c*) of the transmitting device.

In some aspects, the transmitting device may transmit an OAM transmission according to OAM mode 0 (also referred to herein as OAM order 0) via the center antenna (e.g., UCA circle 515-*a*) of the transmitting device. In some aspects, the transmitting device may generate a signal of OAM mode 0 via any of the UCA circles 515 (e.g., UCA circle 515-*b* through UCA circle 515-*e*).

In some examples, multiple OAM transmissions may be received by each UCA circle 515, where the intra-circle transmissions may be demultiplexed if the intra-circle transmissions are associated with different modes. For example, a receiving device may receive a first OAM transmission according to OAM mode 1 via UCA circle 515-*j*, and a second OAM transmission according to OAM mode 2 via UCA circle 515-*j*. The receiving device may receive a third OAM transmission according to OAM mode 1 via UCA circle 515-*i*, a fourth OAM transmission according to OAM mode 2 via UCA circle 515-*i*, a fifth OAM transmission according to OAM mode 1 via UCA circle 515-*h*, a sixth OAM transmission according to OAM mode 2 via UCA circle 515-*h*, a seventh OAM transmission according to OAM mode 1 via UCA circle 515-*g*, and an eighth OAM transmission according to OAM mode 2 via UCA circle 515-*g*. The receiving device may receive one or more OAM transmissions according to one or more OAM modes via UCA circle 515-*f*.

In some aspects, the receiving device may receive an OAM transmission according to OAM mode 0, for example, by using the same weight (e.g., a weight of one) for all antenna elements 530 of a UCA circle 515 (e.g., UCA circle 515-*g*) of the receiving device. In some other aspects, the receiving device may receive an OAM transmission according to OAM mode 0 by using the same weight (e.g., a weight of one) for all antenna elements 530 of multiple UCA circles (e.g., UCA circle 515-*g* and UCA circle 515-*h*) of the receiving device.

In some aspects, the receiving device may receive an OAM transmission according to OAM mode 0 (also referred to herein as OAM order 0) via the center antenna (e.g., UCA circle 515-*f*) of the receiving device. In some other aspects, the receiving device may receive a signal of OAM mode 0 via any of the UCA circles 515 (e.g., UCA circle 515-*f* through UCA circle 515-*j*).

As described herein, intra-circle OAM transmissions may be orthogonal. As such, the first and second OAM transmissions may be orthogonal to one another, and may, in some cases, be multiplexed. Similarly, the third and fourth transmissions may be orthogonal to one another, the fifth and sixth transmissions may be orthogonal to one another, and the seventh and the eighth transmission may be orthogonal to one another. Further, as described herein, inter-circle OAM transmissions transmitted via different OAM mode may be orthogonal. As such, the first transmission may be orthogonal with the fourth transmission, the sixth transmission, and the eight transmission, for example. Further, as described herein, inter-circle OAM transmissions transmitted via the same OAM mode may be non-orthogonal. As such, the first transmission may be non-orthogonal with the third transmission, the fifth transmission, and the seventh transmission, for example.

In some cases, a transmitting device may transmit the first transmission through the eighth transmissions, as described herein, simultaneously. As such, the first transmission through the eighth transmission may be transmitted via a multi-circle UCA panel, such as multiplexing panel 520 that may multiplex one or more of the transmissions into OAM multiplexed signals 525. For example, the intra-circle transmissions may be multiplexed with each other, such as the first transmission and the second transmission. In another example, each of the first transmission through the eighth transmission may be multiplexed as transmitted via different circles and different modes. The transmitting device may transmit the one or more OAM multiplexed signals 525 to a receiving device, where the OAM receiver UCA antennas 510 of the receiving device may spread the one or more OAM multiplexed signals.

Further, although shown in the example depicted in FIG. 5 as two modes (a first and a second mode) being transmitted by each UCA circle 515, each UCA circle 515 may transmit any number of OAM transmissions according to any number of OAM modes. The number of OAM transmissions from each UCA circle 515 may be the same, different, or partially the same, such that all UCA circles 515 at a device may transmit the same number of transmissions, a different number of transmissions, or some UCA circles 515 may transmit the same number of transmissions while other UCA circles may transmit a different number of transmissions. Further, although each device is depicted in FIG. 5 as being configured with 5 UCA circles 515, a device may be configured with any number of UCA circles 515.

In some cases, as inter-circle OAM transmissions of the same mode may interfere with one another, a transmitting device may be configured to transmit a particular mode via a particular UCA circle 515 so as to mitigate interference caused by inter-circle OAM transmissions of the same mode. A transmitting device, or a receiving device, or both may be configured to determine a transmission scheme for the transmitting device that indicates which UCA circle 515 should be used to transmit which OAM mode. In some implementations, the channel gains of OAM transmission streams may be different from each UCA circle 515 for each OAM mode for a set of parameters. The parameters may include system parameters such as a communication distance between a transmitting device and a receiving device, the radius of each transmitter UCA circle 515, the radius of each receiver UCA circle 515, carrier frequency, number of antenna elements 530 in each UCA circle 515. For example, for a set of system parameters (in which the parameters are held constant), an OAM mode of 2 or −2 may have a largest channel gain when transmitted via a UCA transmitter circle radius of 0.8 meters. In another example, for the same set of system parameters, an OAM mode of 1 or −1 may have a largest channel gain when transmitted via a UCA transmitter circle radius of 0.6 meters. In another example, for the same set of system parameters, an OAM mode of 0 may have a largest channel gain when transmitted via a UCA transmitter circle radius of 0.2 meters. Therefore, to achieve high data throughput, a transmitting device may be configured to transmit an OAM transmission via an OAM mode-UCA circle pairing that results in a large (or largest) channel gain.

In some examples, a device that includes OAM receiver UCA antennas 510 (e.g., a UE 115, a network entity 105, a first device 205-*a*) may receive a configuration from a device that includes OAM transmitter UCA antennas 505 (e.g., a UE 115, a network entity 105, a second device 210-*a*). Additionally, the device that includes the OAM receiver UCA antennas 510 may receive one or more reference signals (e.g., a reference signal for each OAM mode for each UCA circle 515). Using the received configuration and/or received reference signals, the device that includes the OAM receiver UCA antennas 510 may generate a report (e.g., a CSI report) that includes PMI. The PMI may include one or more first parameters common to the set of OAM modes (e.g., amplitudes, phases, or codeword indices associated with $W_{com}$) and one or more second parameters for respective ones of the at least a subset of the set of OAM modes (e.g., parameters associated with $W_{ind,m}$ for $m=0 \sim N_{mode}$ or $m=1 \sim N_{mode}$).

Figure 6:
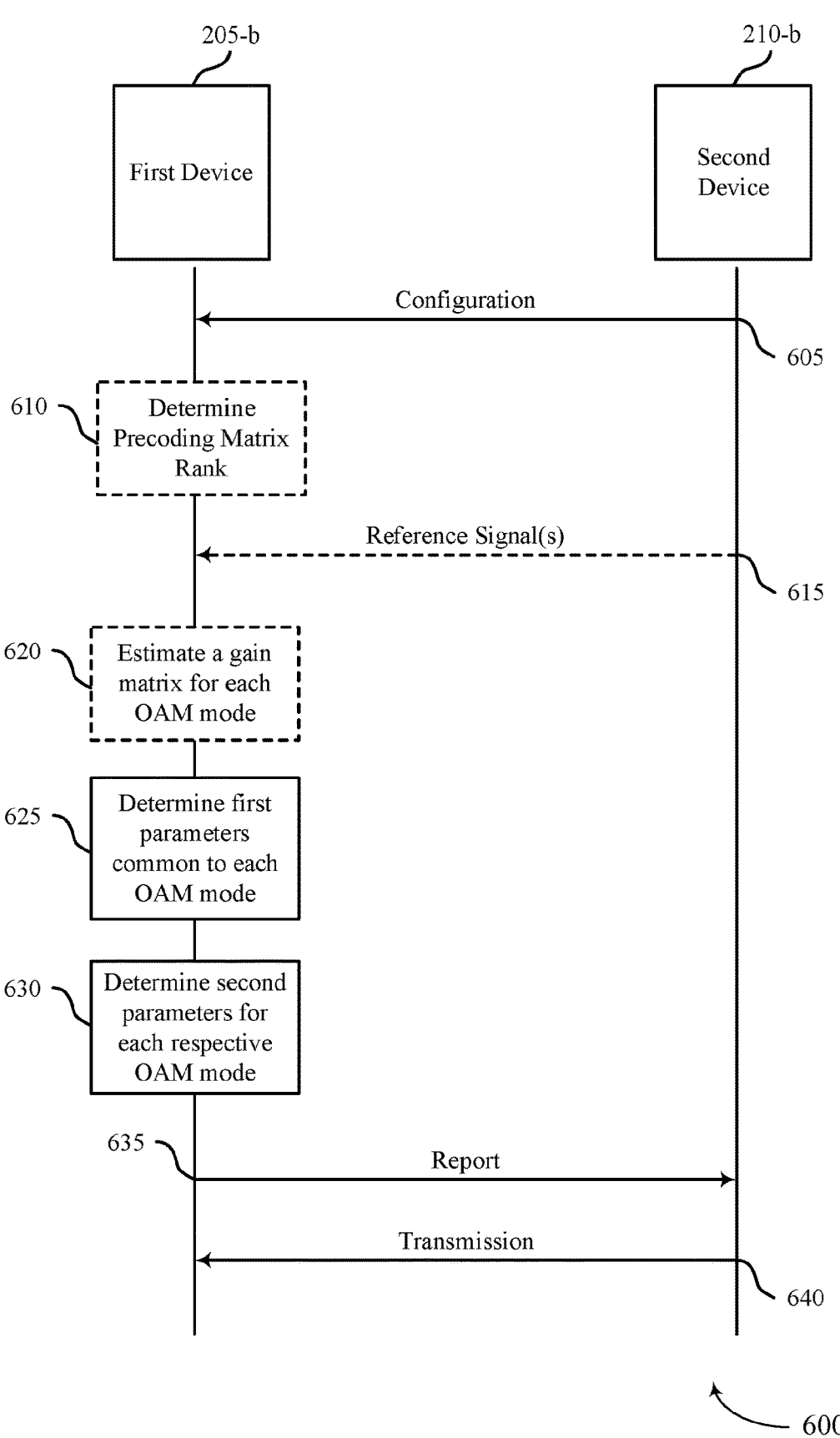
FIG. 6 illustrates an example of a process flow that supports multi-mode PMI report for OAM based communication system in accordance with aspects of the present disclosure.

FIG. 6 illustrates an example of a process flow 600 that supports multi-mode PMI report for OAM based communication system in accordance with aspects of the present disclosure. In some examples, process flow 600 may implement one or more aspects of wireless communications systems 100 and/or 200. For instance, first device 205-*b* may be an example of a UE 115 or a network entity 105 as described with reference to FIG. 1 or a first device 205-*a* as described with reference to FIG. 2 and second device 210-*b* may be an example of a UE 115 or a network entity 105 as described with reference to FIG. 1 or a second device 210-*a* as described with reference to FIG. 2.

At 605, second device 210-*b* may transmit, to first device 205-*b*, a configuration indicating a set of OAM modes for joint reporting. In some examples, at least one of the set of OAM modes may be associated with transmission via two or more of a plurality of sets of antennas arranged in a set of concentric circular arrays. In some examples, the configuration may indicate a total quantity of circular arrays in the set of concentric circular arrays. In some examples, the configuration may include a channel state information configuration. In some examples, the configuration may indicate a threshold quantity (e.g., a maximum quantity) of OAM modes of the set of OAM modes for simultaneous transmission via a set of antenna of the plurality of sets of antennas.

At 610, first device 205-*b* may determine a rank of a precoding matrix for the each of at least the subset of the set of OAM modes based on receiving the configuration indicating the threshold quantity of OAM modes of the set of OAM modes. For example, if a maximum quantity of simultaneous OAM modes for a transmit circle, i, is $n_i$, where i=1~K, a total rank for all OAM modes may not be greater than $$\sum_{i=1}^{K} n_i.$$

Additionally or alternatively, a rank of OAM mode j using transmit circles $\{i_{j,1}, i_{j,2}, \ldots, i_{j,K_j}\}$ may not be greater than the maximum value of $$\left\{ n_{i_{j,1}}, n_{i_{j,2}}, \ldots, n_{i_{j,K_j}} \right\}.$$

At 615, second device 210-*b* may transmit, to first device 205-*b*, a set of reference signals associated with respective circular arrays of the set of concentric circular arrays and respective OAM modes of the set of OAM modes. In some examples, each OAM mode of the set of OAM modes may be associated with transmission via the two or more of the plurality of sets of antennas. In some examples, each OAM mode is associated with the set of concentric circular arrays. In some such examples, second device 210-*b* may transmit, to first device 205-*b*, a set of reference signals corresponding to the plurality of concentric circular arrays.

At 620, first device 205-*b* may estimate a gain matrix for each OAM mode of the set of OAM modes. In some examples, first device 205-*b* may estimate the gain matrix for each OAM mode based on receiving the set of reference signals for each OAM mode.

At 625, first device 205-*b* may determine one or more first parameters common to the set of OAM modes. In some examples, first device 205-*b* may determine the one or more first parameters based on estimating the gain matrix for each OAM mode. In some examples, the one or more first parameters may correspond to a matrix. In some such examples, first device 205-*b* may determine a dimension of the matrix based on a third parameter indicated by the configuration (e.g., at 605). In some examples, the one or more first parameters may include a set of amplitudes, a set of phases, a set of codeword indices, or any combination thereof. In some examples, the one or more first parameters may include an identity matrix At 630, first device 205-*b* may determine, for each OAM mode, the one or more second parameters based on the one or more first parameters and the respective estimated gain matrix.

At 635, first device 205-*b* may transmit, to second device 210-*b*, a report indicating precoding information for each of at least a subset of the set of OAM modes. In some such examples, the precoding information may include the one or more first parameters common to the set of OAM modes (e.g., one or more amplitudes, phases, codeword indices, or a combination thereof associated with $W_{com}$ as described herein, for instance, with reference to FIG. 2) and the one or more second parameters for respective ones of the at least the subset of the set of OAM modes (e.g., one or more amplitudes and/or phases associated with $W_{ind,m}$ as described herein, for instance, with reference to FIG. 2). In some examples, transmitting the report may be based on receiving the set of reference signals. For instance, first device 205-*b* may determine $W_{com}$ and/or $W_{ind,m}$ based on the received reference signals (e.g., CSI-RSs) and may indicate one or more parameters (e.g., amplitude, phase, codeword indices) associated with $W_{com}$ and/or $W_{ind,m}$ in the report. In some examples, transmitting the report may be based on the configuration indicating the total quantity of circular arrays. For instance, $W_{com}$ may be a $N_{tx} \times L$ matrix and may thus be generated according to an identified $N_{tx}$ value (e.g., received in the configuration). In some examples, the report may include, for one or more OAM modes of the set of OAM modes, the one or more second parameters for a set of layers. In some examples, the report may include a channel state information report.

In some examples, first device 205-*b* may transmit percircle feedback (e.g., via a set of individual reports) indicating additional precoding information for each circular array of the set of concentric circular arrays. In some such examples, each report of the set of individual reports may include respective additional precoding information (e.g., $\tilde{w}_{i,m,l}$ as described herein, for instance, with reference to FIG. 2) for a different circular array of the set of concentric circular arrays. In some examples, transmitting the per-circle feedback (e.g., the set of individual reports) may be based on transmitting the report (e.g., the per-mode feedback). For instance, first device 205-*b* may reallocate a transmission power for one or more circular arrays of the set of concentric circular arrays (e.g., after transmitting the report indicating the one or more first parameters and the one or more second parameters). In some such examples, transmitting per circlefeedback (e.g., the set of individual reports) may be based on the reallocating.

At 640, second device 210-*b* may transmit, to first device 205-*b*, a transmission via one or more of the set of OAM modes based on receiving the report. In some examples, first device 205-*b* may receive the transmission via one or more of the set of OAM modes based on transmitting the report indicating precoding information.

In some examples, one or more of communicating (e.g., transmitting, receiving) the configuration, the report, or the transmission may be based on first polarization, a second polarization, or both. In some examples, the first polarization may include a first linear polarization and the second polarization may include a second linear polarization. In some examples, the first polarization may include a first rotation direction associated with a circular polarization and the second polarization may include a second rotation direction associated with the circular polarization. In some examples, the first polarization may include a first rotation direction associated with an elliptical polarization and the second polarization may include a second rotation direction associated with the elliptical polarization.

Although the present example describes first device 205-*b* transmitting the report (e.g., at 625) and second device 210-*b* transmitting the configuration (e.g., at 605), the reference signals (e.g., at 615) and/or the transmission (e.g., at 640), there may be examples where first device 205-*b* may transmit the configuration, the reference signals, and/or the transmission to second device 210-*b*. Additionally or alternatively, there may be examples where second device 210-*b* transmits the report to first device 205-*b*.

Figure 7:
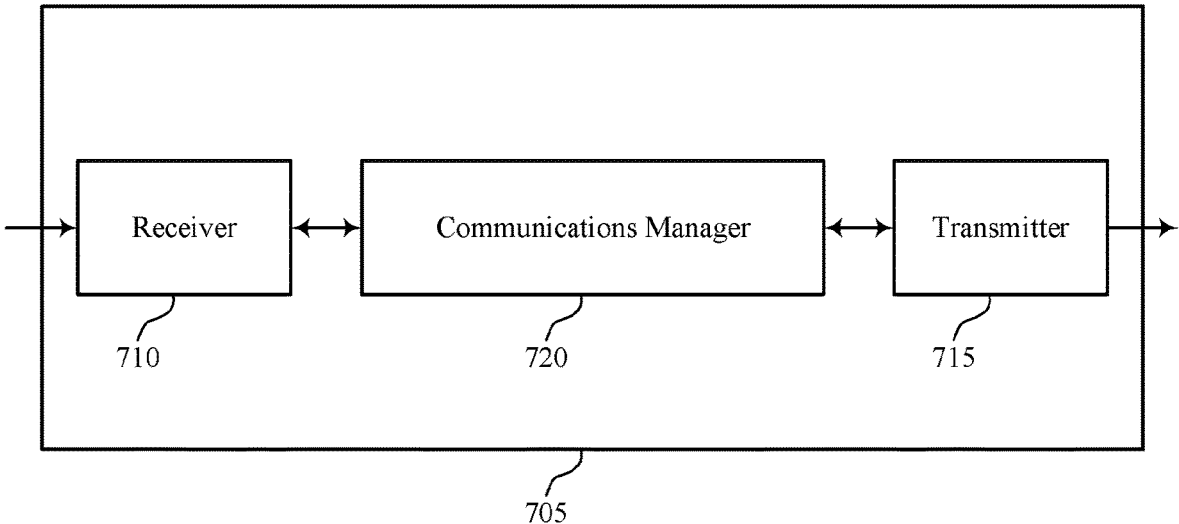
FIGS. 7 and 8 show block diagrams of devices that support multi-mode precoding matrix information report for orbital angular momentum based communication system in accordance with aspects of the present disclosure.

FIG. 7 shows a block diagram 700 of a device 705 that supports multi-mode PMI report for OAM based communication system in accordance with one or more aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to multi-mode precoding matrix information report for orbital angular momentum based communication system). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to multi-mode precoding matrix information report for orbital angular momentum based communication system). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of multi-mode precoding matrix information report for orbital angular momentum based communication system as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication in accordance with examples as disclosed herein. For example, the communications manager 720 may be configured as or otherwise support a means for receiving a configuration indicating a set of orbital angular momentum modes for joint reporting, where at least one of the set of orbital angular momentum modes is associated with transmission via two or more of a set of multiple sets of antennas arranged in a set of multiple concentric circular arrays. The communications manager 720 may be configured as or otherwise support a means for transmitting a report indicating precoding information for each of at least a subset of the set of orbital angular momentum modes, where the precoding information includes one or more first parameters common to the set of orbital angular momentum modes and one or more second parameters for respective ones of the at least the subset of the set of orbital angular momentum modes. The communications manager 720 may be configured as or otherwise support a means for receiving a transmission via one or more of the set of orbital angular momentum modes based on transmitting the report indicating the precoding information.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for the device 705 to reduce overhead associated with communicating (e.g., transmitting) PMI for multiple OAM modes. For instance, communicating the first parameters common to the set of OAM modes once may reduce overhead as compared to transmitting individual PMI reports for each antenna circle of the set of antenna circles. Transmitting PMI with reduced overhead may increase the efficiency of communications between the device 705 and a device with which device 705 is communicating.

Figure 8:
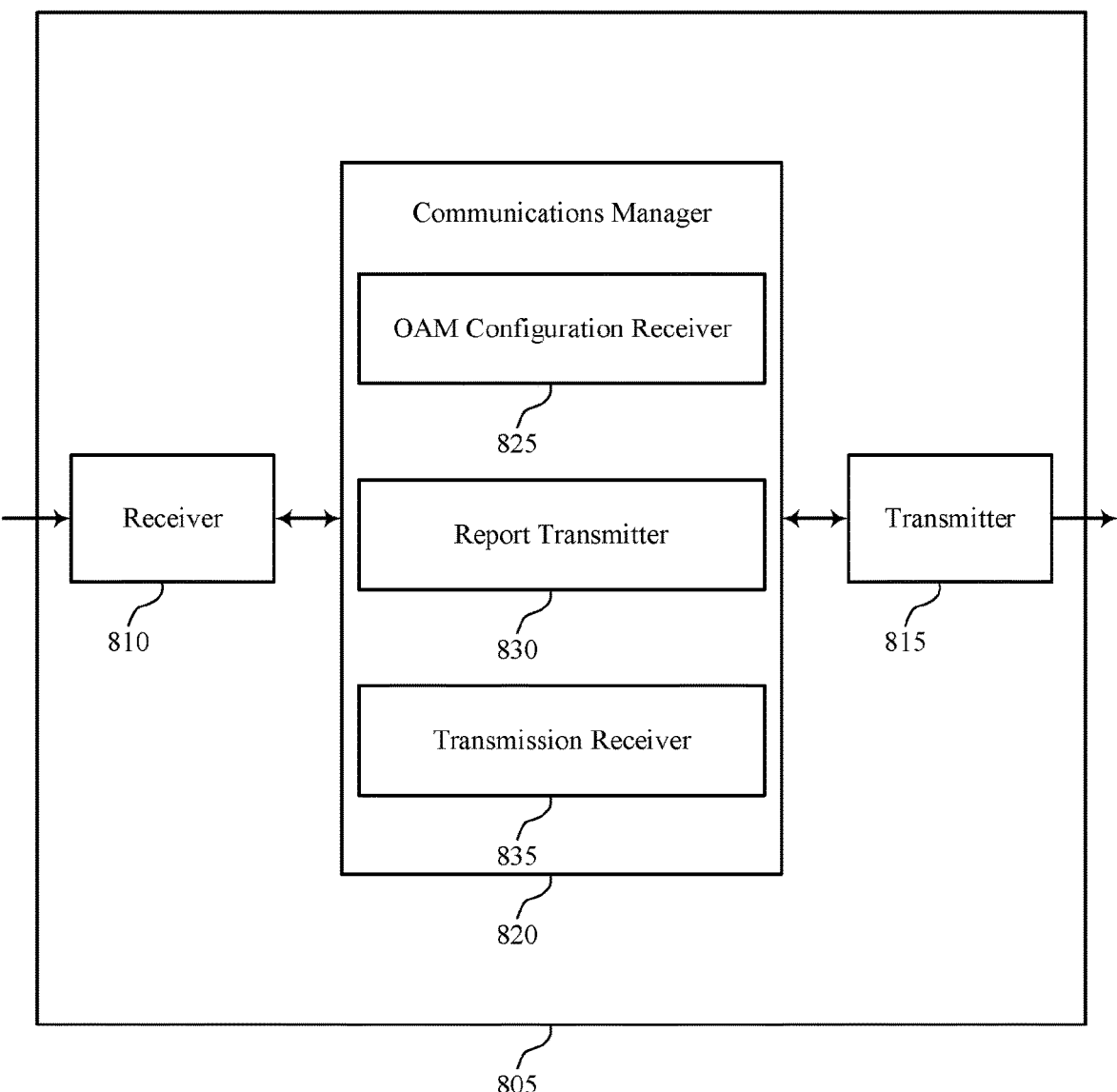

FIG. 8 shows a block diagram 800 of a device 805 that supports multi-mode PMI report for OAM based communication system in accordance with one or more aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to multi-mode precoding matrix information report for orbital angular momentum based communication system). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to multi-mode precoding matrix information report for orbital angular momentum based communication system). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of multi-mode precoding matrix information report for orbital angular momentum based communication system as described herein. For example, the communications manager 820 may include a OAM configuration receiver 825, a report transmitter 830, a transmission receiver 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication in accordance with examples as disclosed herein. The OAM configuration receiver 825 may be configured as or otherwise support a means for receiving a configuration indicating a set of orbital angular momentum modes for joint reporting, where at least one of the set of orbital angular momentum modes is associated with transmission via two or more of a set of multiple sets of antennas arranged in a set of multiple concentric circular arrays. The report transmitter 830 may be configured as or otherwise support a means for transmitting a report indicating precoding information for each of at least a subset of the set of orbital angular momentum modes, where the precoding information includes one or more first parameters common to the set of orbital angular momentum modes and one or more second parameters for respective ones of the at least the subset of the set of orbital angular momentum modes. The transmission receiver 835 may be configured as or otherwise support a means for receiving a transmission via one or more of the set of orbital angular momentum modes based on transmitting the report indicating the precoding information.

Figure 9:
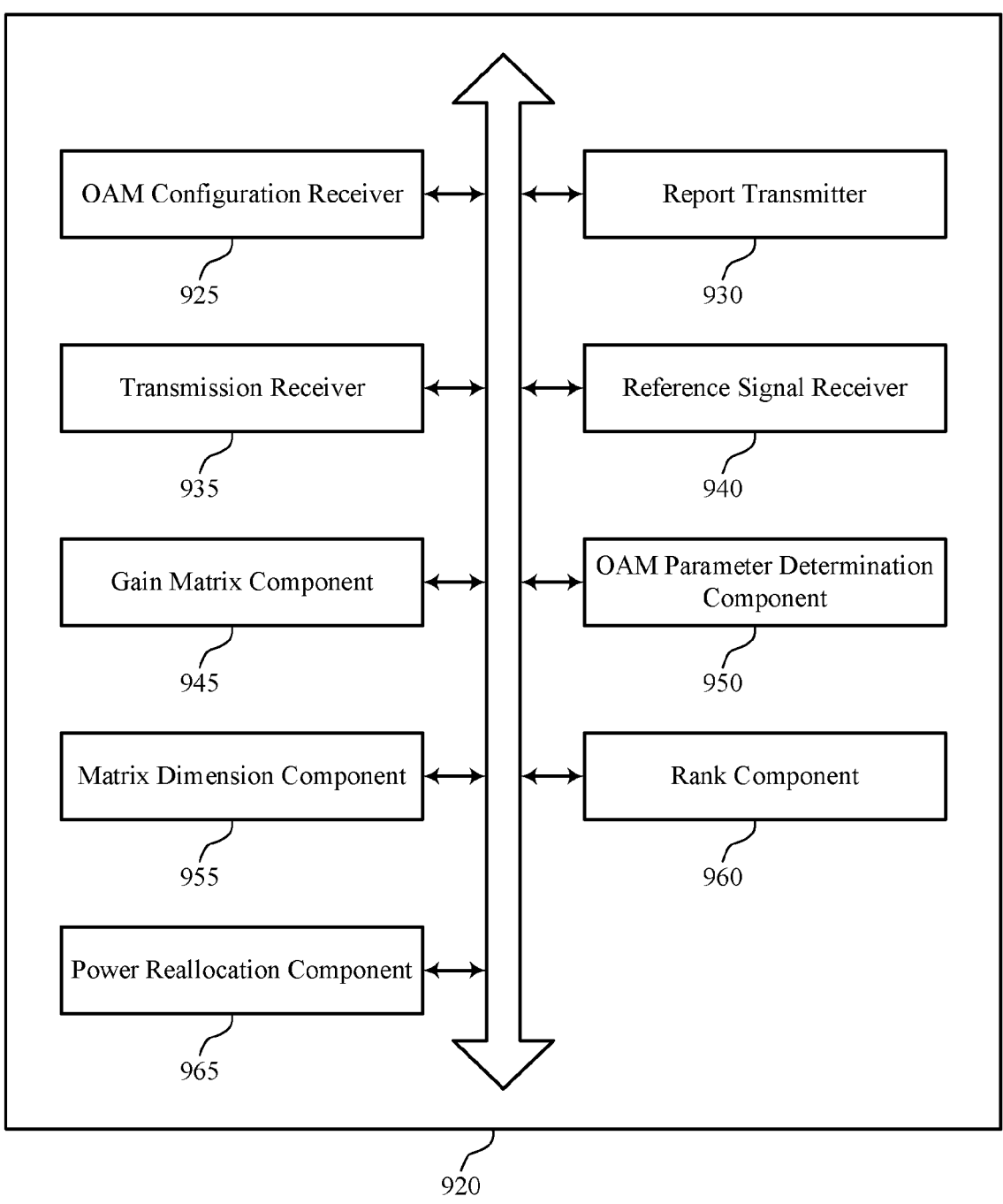
FIG. 9 shows a block diagram of a communications manager that supports multi-mode PMI report for OAM based communication system in accordance with aspects of the present disclosure.

FIG. 9 shows a block diagram 900 of a communications manager 920 that supports multi-mode PMI report for OAM based communication system in accordance with one or more aspects of the present disclosure. The communications manager 920 may be an example of aspects of a communications manager 720, a communications manager 820, or both, as described herein. The communications manager 920, or various components thereof, may be an example of means for performing various aspects of multi-mode precoding matrix information report for orbital angular momentum based communication system as described herein. For example, the communications manager 920 may include a OAM configuration receiver 925, a report transmitter 930, a transmission receiver 935, a reference signal receiver 940, a gain matrix component 945, a OAM parameter determination component 950, a matrix dimension component 955, a rank component 960, a power reallocation component 965, or any combination thereof. Each of these components may communicate, directly or indirectly, with one another (e.g., via one or more buses).

The communications manager 920 may support wireless communication in accordance with examples as disclosed herein. The OAM configuration receiver 925 may be configured as or otherwise support a means for receiving a configuration indicating a set of orbital angular momentum modes for joint reporting, where at least one of the set of orbital angular momentum modes is associated with transmission via two or more of a set of multiple sets of antennas arranged in a set of multiple concentric circular arrays. The report transmitter 930 may be configured as or otherwise support a means for transmitting a report indicating precoding information for each of at least a subset of the set of orbital angular momentum modes, where the precoding information includes one or more first parameters common to the set of orbital angular momentum modes and one or more second parameters for respective ones of the at least the subset of the set of orbital angular momentum modes. The transmission receiver 935 may be configured as or otherwise support a means for receiving a transmission via one or more of the set of orbital angular momentum modes based on transmitting the report indicating the precoding information.

In some examples, to support receiving the configuration indicating the set of orbital angular momentum modes for joint reporting, the OAM configuration receiver 925 may be configured as or otherwise support a means for receiving the configuration indicating a threshold quantity of orbital angular momentum modes of the set of orbital angular momentum modes for simultaneous transmission via a set of antenna of the set of multiple sets of antennas.

In some examples, the rank component 960 may be configured as or otherwise support a means for determining a rank of a precoding matrix for the each of at least the subset of the set of orbital angular momentum modes based on receiving the configuration indicating the threshold quantity of orbital angular momentum modes of the set of orbital angular momentum modes.

In some examples, each orbital angular momentum mode of the set of orbital angular momentum modes is associated with transmission via one or more of the set of multiple sets of antennas arranged in the set of multiple concentric circular arrays, and the reference signal receiver 940 may be configured as or otherwise support a means for receiving a set of multiple reference signals associated with respective circular arrays of the set of multiple concentric circular arrays and respective orbital angular momentum modes of the set of orbital angular momentum modes, where transmitting the report is based on receiving the set of multiple reference signals.

In some examples, the configuration indicates a total quantity of circular arrays in the set of multiple concentric circular arrays. In some examples, transmitting the report is based on the configuration indicating the total quantity of circular arrays.

In some examples, the gain matrix component 945 may be configured as or otherwise support a means for estimating a gain matrix for each orbital angular momentum mode of the set of orbital angular momentum modes. In some examples, the OAM parameter determination component 950 may be configured as or otherwise support a means for determining the one or more first parameters common to the set of orbital angular momentum modes based on estimating the gain matrix for each orbital angular momentum mode.

In some examples, the OAM parameter determination component 950 may be configured as or otherwise support a means for determining, for each orbital angular momentum mode, the one or more second parameters based on the one or more first parameters and the respective estimated gain matrix.

In some examples, each orbital angular momentum mode is associated with a set of multiple concentric circular arrays, and the reference signal receiver 940 may be configured as or otherwise support a means for receiving, for each orbital angular momentum mode, a set of reference signals corresponding to the respective set of circular arrays, where the gain matrix is estimated for each orbital angular momentum mode based on receiving the set of reference signals for each orbital angular momentum mode.

In some examples, the one or more first parameters correspond to a matrix, and the matrix dimension component 955 may be configured as or otherwise support a means for determining a dimension of the matrix based on a third parameter indicated by the configuration.

In some examples, the report transmitter 930 may be configured as or otherwise support a means for transmitting a set of multiple reports indicating additional precoding information for each circular array of the set of multiple concentric circular arrays, where each report of the plurality includes respective additional precoding information for a different circular array of the set of multiple concentric circular arrays, where transmitting the set of multiple reports is based on transmitting the report.

In some examples, the power reallocation component 965 may be configured as or otherwise support a means for reallocating a transmission power for one or more circular arrays of the set of multiple concentric circular arrays, where transmitting the set of multiple reports is based on the reallocating.

In some examples, the one or more first parameters include a set of amplitudes, a set of phases, a set of codeword indices, or any combination thereof.

In some examples, the report includes, for one or more orbital angular momentum modes of the set of orbital angular momentum modes, the one or more second parameters for a set of multiple layers.

In some examples, the configuration includes a channel state information configuration. In some examples, the report includes a channel state information report.

In some examples, the one or more first parameters include an identity matrix.

In some examples, one or more of receiving the configuration, transmitting the report, and receiving the transmission is based on a first polarization, a second polarization, or both.

In some examples, the first polarization includes a first linear polarization and the second polarization includes a second linear polarization. In some examples, the first polarization includes a first rotation direction associated with a circular polarization and the second polarization includes a second rotation direction associated with the circular polarization. In some examples, the first polarization includes a first rotation direction associated with an elliptical polarization and the second polarization includes a second rotation direction associated with the elliptical polarization.

Figure 10:
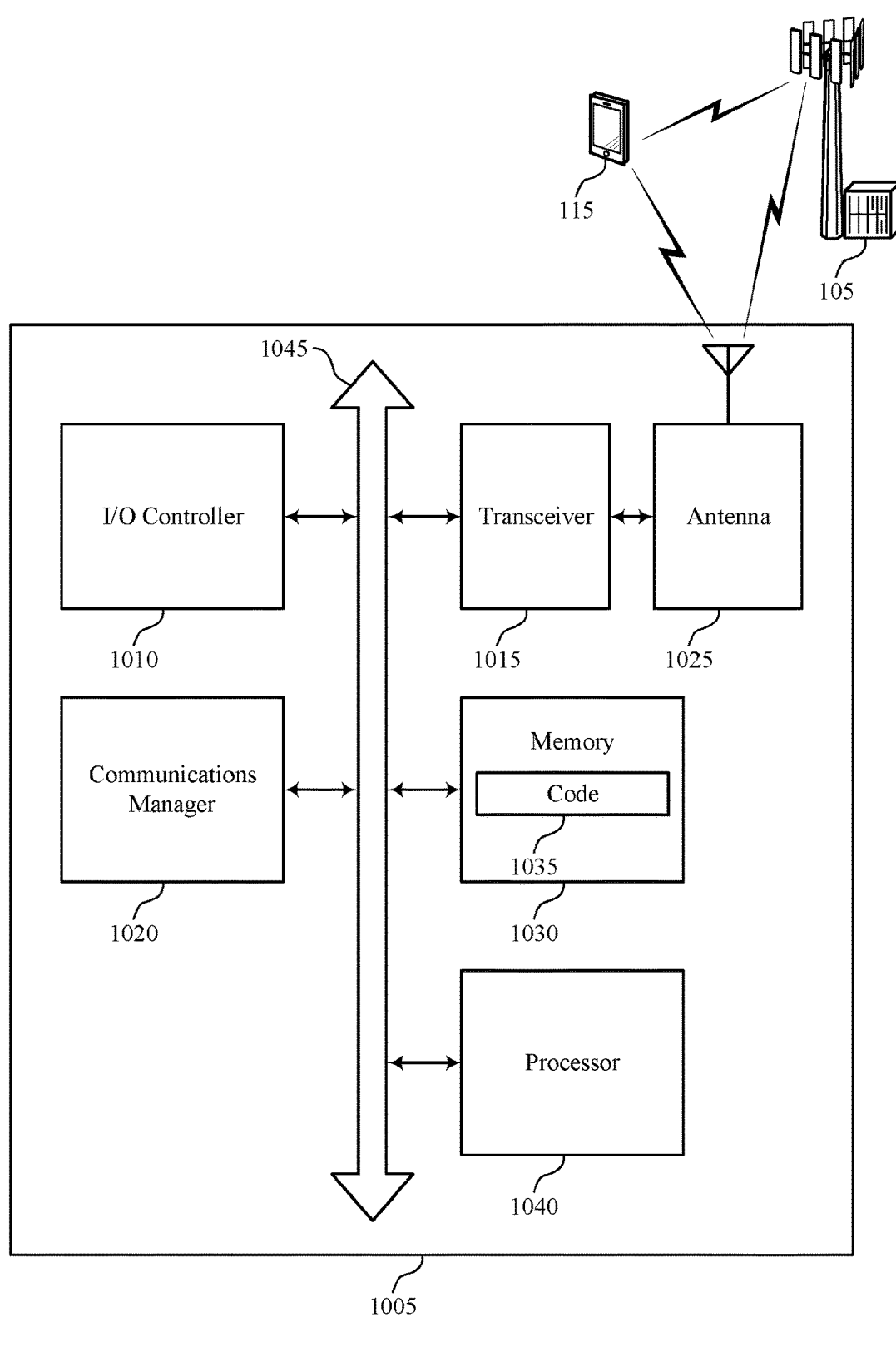
FIG. 10 shows a diagram of a system including a device that supports multi-mode PMI report for OAM based communication system in accordance with aspects of the present disclosure.

FIG. 10 shows a diagram of a system 1000 including a device 1005 that supports multi-mode PMI report for OAM based communication system in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting multi-mode precoding matrix information report for orbital angular momentum based communication system). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communication in accordance with examples as disclosed herein. For example, the communications manager 1020 may be configured as or otherwise support a means for receiving a configuration indicating a set of orbital angular momentum modes for joint reporting, where at least one of the set of orbital angular momentum modes is associated with transmission via two or more of a set of multiple sets of antennas arranged in a set of multiple concentric circular arrays. The communications manager 1020 may be configured as or otherwise support a means for transmitting a report indicating precoding information for each of at least a subset of the set of orbital angular momentum modes, where the precoding information includes one or more first parameters common to the set of orbital angular momentum modes and one or more second parameters for respective ones of the at least the subset of the set of orbital angular momentum modes. The communications manager 1020 may be configured as or otherwise support a means for receiving a transmission via one or more of the set of orbital angular momentum modes based on transmitting the report indicating the precoding information.

By including or configuring the communications manager 1020 in accordance with examples as described herein, the device 1005 may support techniques for the device 1005 to reduce overhead associated with communicating (e.g., transmitting) PMI for multiple OAM modes. For instance, communicating the first parameters common to the set of OAM modes once may reduce overhead as compared to transmitting individual PMI reports for each antenna circle of the set of antenna circles. Transmitting PMI with reduced overhead may increase the efficiency of communications between the device 1005 and a device with which device 1005 is communicating.

In some examples, the communications manager 1020 may be configured to perform various operations (e.g., receiving, monitoring, transmitting) using or otherwise in cooperation with the transceiver 1015, the one or more antennas 1025, or any combination thereof. For example, the communications manager 1020 may be configured to receive or transmit messages or other signals as described herein via the transceiver 1015. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of multi-mode precoding matrix information report for orbital angular momentum based communication system as described herein, or the processor 1040 and the memory 1030 may be otherwise configured to perform or support such operations.

Figure 11:
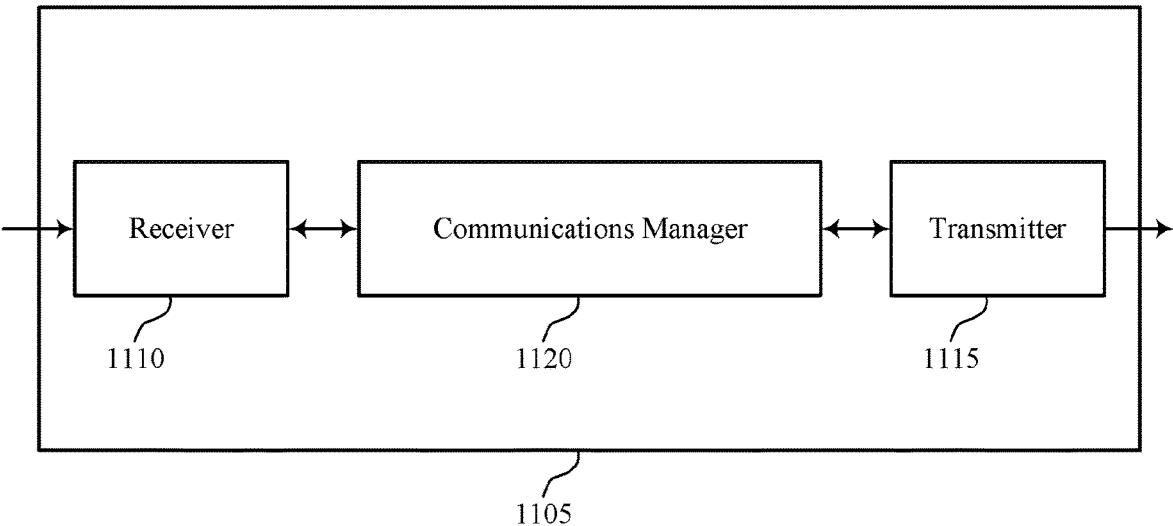
FIGS. 11 and 12 show block diagrams of devices that support multi-mode precoding matrix information report for orbital angular momentum based communication system in accordance with aspects of the present disclosure.

FIG. 11 shows a block diagram 1100 of a device 1105 that supports multi-mode PMI report for OAM based communication system in accordance with one or more aspects of the present disclosure. The device 1105 may be an example of aspects of a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of multi-mode precoding matrix information report for orbital angular momentum based communication system as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication in accordance with examples as disclosed herein. For example, the communications manager 1120 may be configured as or otherwise support a means for transmitting a configuration indicating a set of orbital angular momentum modes for joint reporting, where at least one of the set of orbital angular momentum modes is associated with transmission via two or more of a set of multiple sets of antennas arranged in a set of multiple concentric circular arrays. The communications manager 1120 may be configured as or otherwise support a means for receiving a report indicating precoding information for each of at least a subset of the set of orbital angular momentum modes, where the precoding information includes one or more first parameters common to the set of orbital angular momentum modes and one or more second parameters for respective ones of the at least the subset of the set of orbital angular momentum modes. The communications manager 1120 may be configured as or otherwise support a means for transmitting a transmission via one or more of the set of orbital angular momentum modes based on receiving the report indicating the precoding information.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for the device 1105 to reduce overhead associated with communicating (e.g., receiving) PMI for multiple OAM modes. For instance, communicating the first parameters common to the set of OAM modes once may reduce overhead as compared to transmitting individual PMI reports for each antenna circle of the set of antenna circles. Receiving PMI with reduced overhead may increase the efficiency of communications between the device 1105 and a device with which device 1105 is communicating.

Figure 12:
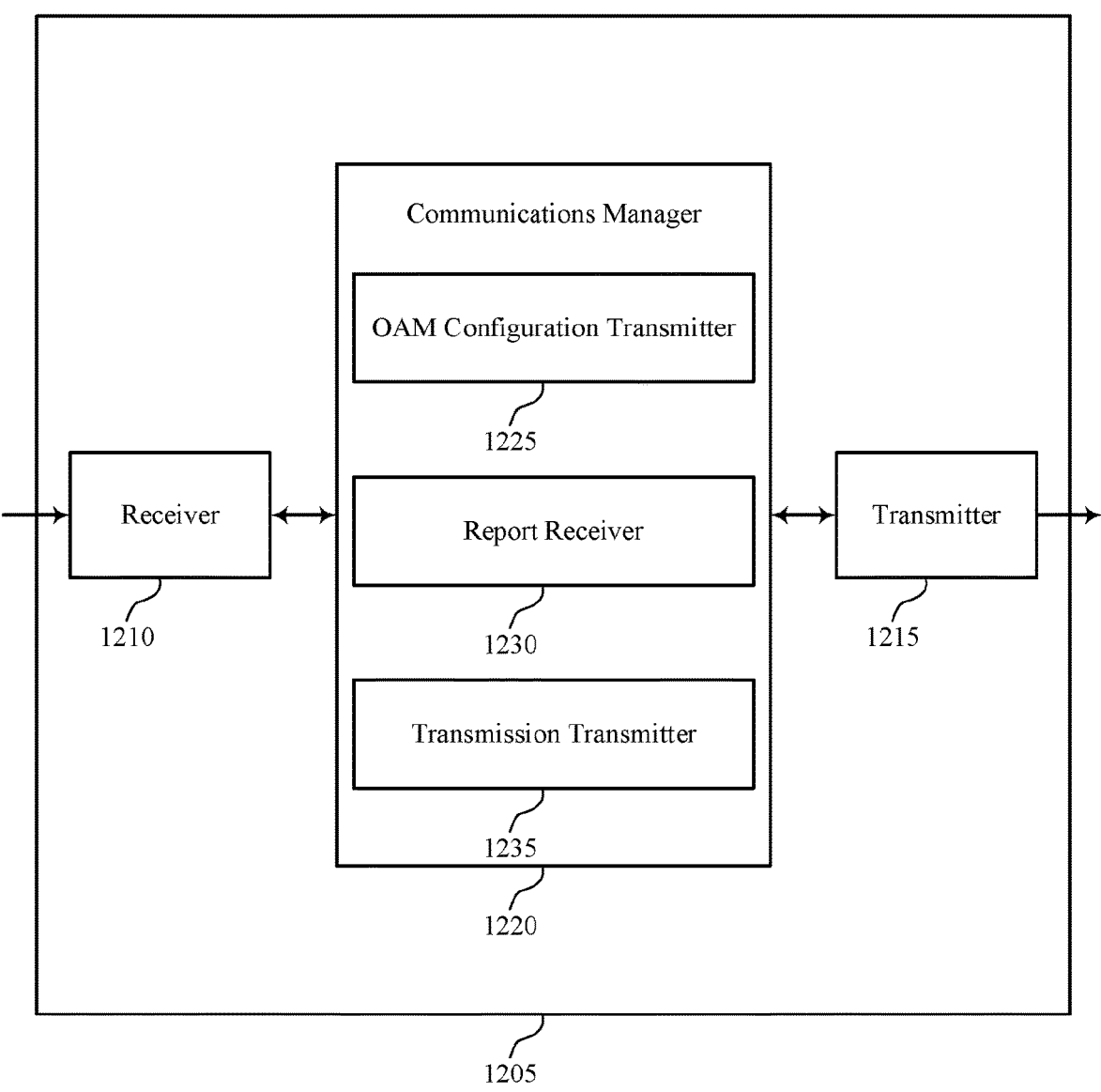

FIG. 12 shows a block diagram 1200 of a device 1205 that supports multi-mode PMI report for OAM based communication system in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of multi-mode precoding matrix information report for orbital angular momentum based communication system as described herein. For example, the communications manager 1220 may include a OAM configuration transmitter 1225, a report receiver 1230, a transmission transmitter 1235, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communication in accordance with examples as disclosed herein. The OAM configuration transmitter 1225 may be configured as or otherwise support a means for transmitting a configuration indicating a set of orbital angular momentum modes for joint reporting, where at least one of the set of orbital angular momentum modes is associated with transmission via two or more of a set of multiple sets of antennas arranged in a set of multiple concentric circular arrays. The report receiver 1230 may be configured as or otherwise support a means for receiving a report indicating precoding information for each of at least a subset of the set of orbital angular momentum modes, where the precoding information includes one or more first parameters common to the set of orbital angular momentum modes and one or more second parameters for respective ones of the at least the subset of the set of orbital angular momentum modes. The transmission transmitter 1235 may be configured as or otherwise support a means for transmitting a transmission via one or more of the set of orbital angular momentum modes based on receiving the report indicating the precoding information.

Figure 13:
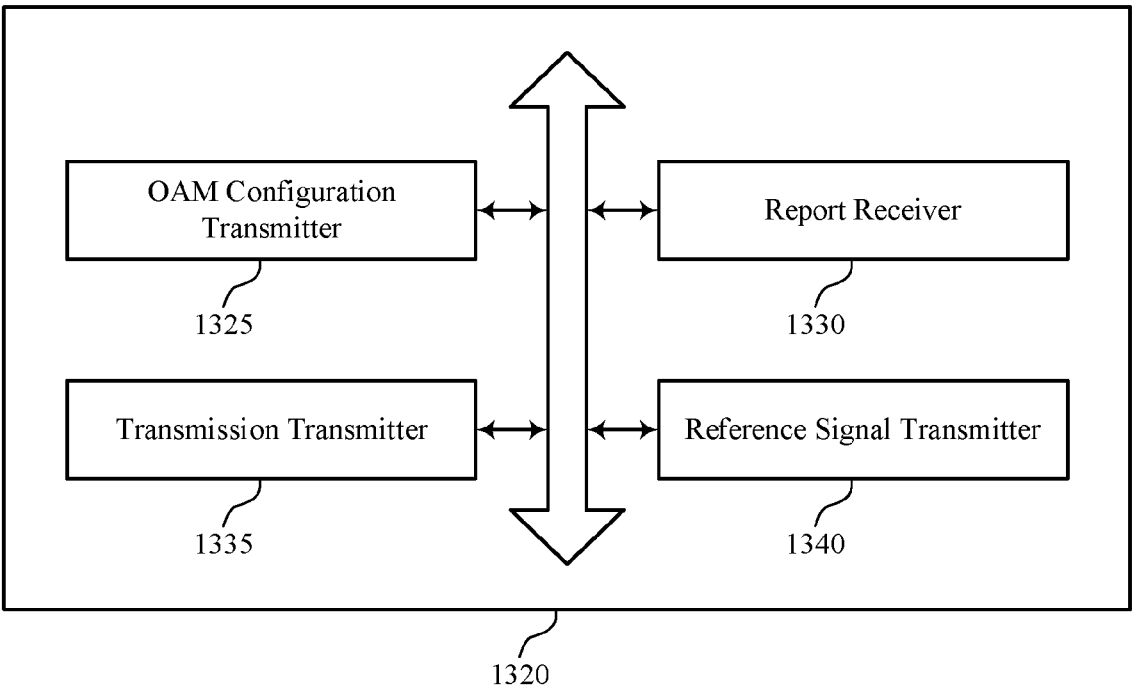
FIG. 13 shows a block diagram of a communications manager that supports multi-mode PMI report for OAM based communication system in accordance with aspects of the present disclosure.

FIG. 13 shows a block diagram 1300 of a communications manager 1320 that supports multi-mode PMI report for OAM based communication system in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of multi-mode precoding matrix information report for orbital angular momentum based communication system as described herein. For example, the communications manager 1320 may include a OAM configuration transmitter 1325, a report receiver 1330, a transmission transmitter 1335, a reference signal transmitter 1340, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communication in accordance with examples as disclosed herein. The OAM configuration transmitter 1325 may be configured as or otherwise support a means for transmitting a configuration indicating a set of orbital angular momentum modes for joint reporting, where at least one of the set of orbital angular momentum modes is associated with transmission via two or more of a set of multiple sets of antennas arranged in a set of multiple concentric circular arrays. The report receiver 1330 may be configured as or otherwise support a means for receiving a report indicating precoding information for each of at least a subset of the set of orbital angular momentum modes, where the precoding information includes one or more first parameters common to the set of orbital angular momentum modes and one or more second parameters for respective ones of the at least the subset of the set of orbital angular momentum modes. The transmission transmitter 1335 may be configured as or otherwise support a means for transmitting a transmission via one or more of the set of orbital angular momentum modes based on receiving the report indicating the precoding information.

In some examples, to support transmitting the configuration indicating the set of orbital angular momentum modes for joint reporting, the OAM configuration transmitter 1325 may be configured as or otherwise support a means for transmitting the configuration indicating a threshold quantity of orbital angular momentum modes of the set of orbital angular momentum modes for simultaneous transmission via a set of antenna of the set of multiple sets of antennas.

In some examples, each orbital angular momentum mode of the set of orbital angular momentum modes is associated with transmission via one or more of the set of multiple sets of antennas arranged in the set of multiple concentric circular arrays, and the reference signal transmitter 1340 may be configured as or otherwise support a means for transmitting respective reference signals for each circular array of the set of multiple concentric circular arrays and each orbital angular momentum mode of the set of orbital angular momentum modes, where receiving the report is based on transmitting the respective reference signals.

In some examples, the configuration indicates a total quantity of circular arrays in the set of multiple concentric circular arrays. In some examples, receiving the report is based on the configuration indicating the total quantity of circular arrays.

In some examples, the report receiver 1330 may be configured as or otherwise support a means for receiving a set of multiple reports indicating additional precoding information for each circular array of the set of multiple concentric circular arrays, where each report of the plurality includes respective additional precoding information for a different circular array of the set of multiple concentric circular arrays, where transmitting the set of multiple reports is based on transmitting the report.

In some examples, the one or more first parameters correspond to a matrix. In some examples, the configuration indicates a third parameter associated with a size of the matrix.

In some examples, the one or more first parameters include a set of amplitudes, a set of phases, a set of codeword indices, or any combination thereof.

In some examples, the report includes, for one or more orbital angular momentum modes of the set of orbital angular momentum modes, the one or more second parameters for a set of multiple layers.

In some examples, the configuration includes a channel state information configuration, the report includes a channel state information report, the one or more first parameters include an identity matrix, or any combination thereof.

In some examples, one or more of transmitting the configuration, receiving the report, and transmitting the transmission is based on a first polarization, a second polarization, or both.

In some examples, the first polarization includes a first linear polarization and the second polarization includes a second linear polarization. In some examples, the first polarization includes a first rotation direction associated with a circular polarization and the second polarization includes a second rotation direction associated with the circular polarization. In some examples, the first polarization includes a first rotation direction associated with an elliptical polarization and the second polarization includes a second rotation direction associated with the elliptical polarization.

Figure 14:
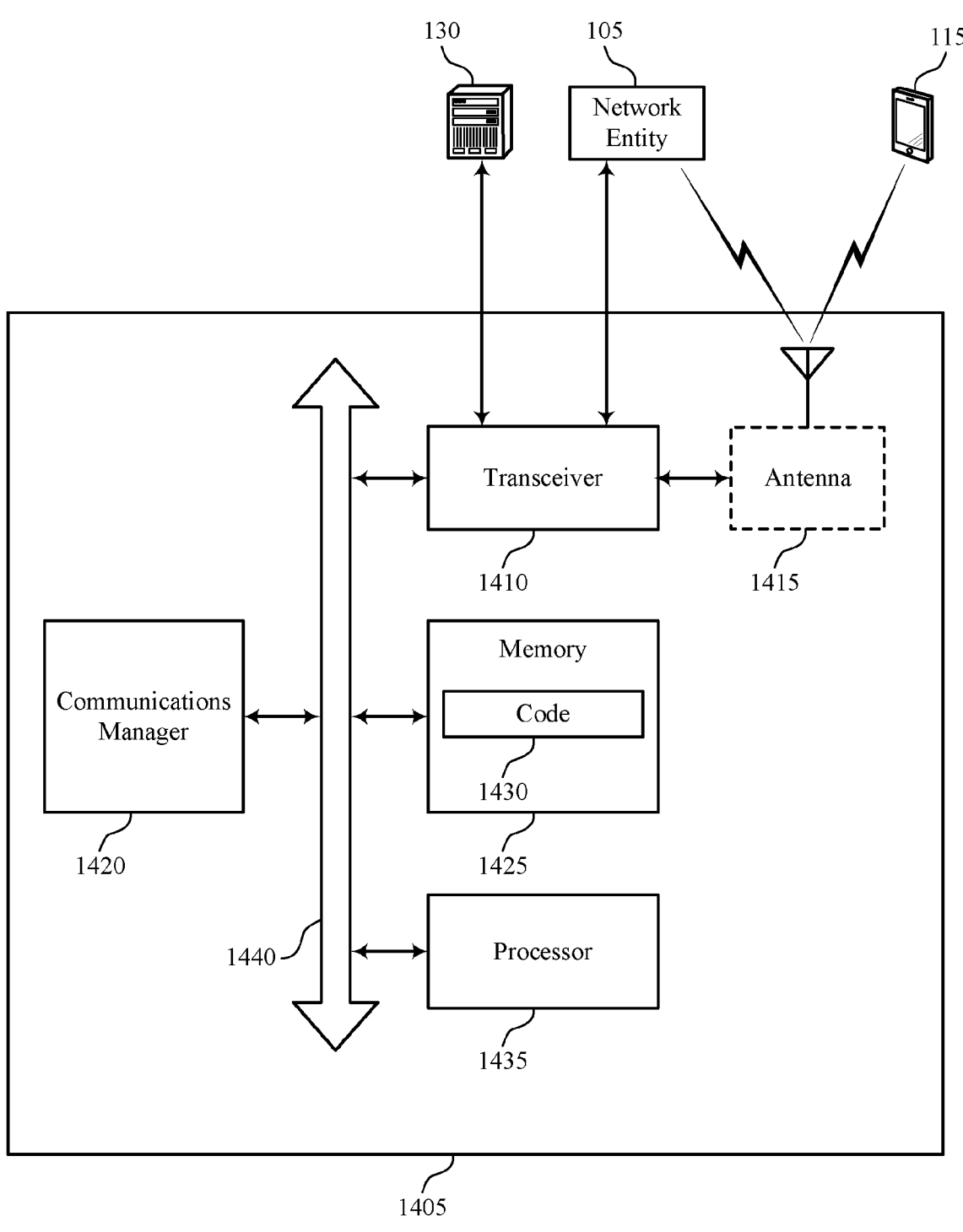
FIG. 14 shows a diagram of a system including a device that supports multi-mode PMI report for OAM based communication system in accordance with aspects of the present disclosure.

FIG. 14 shows a diagram of a system 1400 including a device 1405 that supports multi-mode PMI report for OAM based communication system in accordance with one or more aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, a memory 1425, code 1430, and a processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. The transceiver 1410, or the transceiver 1410 and one or more antennas 1415 or wired interfaces, where applicable, may be an example of a transmitter 1115, a transmitter 1215, a receiver 1110, a receiver 1210, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1425 may include RAM and ROM. The memory 1425 may store computer-readable, computer-executable code 1430 including instructions that, when executed by the processor 1435, cause the device 1405 to perform various functions described herein. The code 1430 may be stored in a non-transitory computer-readable medium such as system memory or another type of memory. In some cases, the code 1430 may not be directly executable by the processor 1435 but may cause a computer (e.g., when compiled and executed) to perform functions described herein. In some cases, the memory 1425 may contain, among other things, a BIOS which may control basic hardware or software operation such as the interaction with peripheral components or devices.

The processor 1435 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1435 may be configured to operate a memory array using a memory controller. In some other cases, a memory controller may be integrated into the processor 1435. The processor 1435 may be configured to execute computer-readable instructions stored in a memory (e.g., the memory 1425) to cause the device 1405 to perform various functions (e.g., functions or tasks supporting multi-mode precoding matrix information report for orbital angular momentum based communication system). For example, the device 1405 or a component of the device 1405 may include a processor 1435 and memory 1425 coupled with the processor 1435, the processor 1435 and memory 1425 configured to perform various functions described herein. The processor 1435 may be an example of a cloud-computing platform (e.g., one or more physical nodes and supporting software such as operating systems, virtual machines, or container instances) that may host the functions (e.g., by executing code 1430) to perform the functions of the device 1405.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the memory 1425, the code 1430, and the processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105, and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

The communications manager 1420 may support wireless communication in accordance with examples as disclosed herein. For example, the communications manager 1420 may be configured as or otherwise support a means for transmitting a configuration indicating a set of orbital angular momentum modes for joint reporting, where at least one of the set of orbital angular momentum modes is associated with transmission via two or more of a set of multiple sets of antennas arranged in a set of multiple concentric circular arrays. The communications manager 1420 may be configured as or otherwise support a means for receiving a report indicating precoding information for each of at least a subset of the set of orbital angular momentum modes, where the precoding information includes one or more first parameters common to the set of orbital angular momentum modes and one or more second parameters for respective ones of the at least the subset of the set of orbital angular momentum modes. The communications manager 1420 may be configured as or otherwise support a means for transmitting a transmission via one or more of the set of orbital angular momentum modes based on receiving the report indicating the precoding information.

By including or configuring the communications manager 1420 in accordance with examples as described herein, the device 1405 may support techniques for the device 1405 to reduce overhead associated with communicating (e.g., receiving) PMI for multiple OAM modes. For instance, communicating the first parameters common to the set of OAM modes once may reduce overhead as compared to transmitting individual PMI reports for each antenna circle of the set of antenna circles. Receiving PMI with reduced overhead may increase the efficiency of communications between the device 1405 and a device with which device 1405 is communicating.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the processor 1435, the memory 1425, the code 1430, the transceiver 1410, or any combination thereof. For example, the code 1430 may include instructions executable by the processor 1435 to cause the device 1405 to perform various aspects of multi-mode precoding matrix information report for orbital angular momentum based communication system as described herein, or the processor 1435 and the memory 1425 may be otherwise configured to perform or support such operations.

FIG. 15 shows a flowchart illustrating a method 1500 that supports multi-mode PMI report for OAM based communication system in accordance with one or more aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include receiving a configuration indicating a set of orbital angular momentum modes for joint reporting, where at least one of the set of orbital angular momentum modes is associated with transmission via two or more of a set of multiple sets of antennas arranged in a set of multiple concentric circular arrays. The operations of 1505 may be performed in accordance with examples as disclosed herein. In some examples, aspects of the operations of 1505 may be performed by a OAM configuration receiver 925 as described with reference to FIG. 9.

At 1510, the method may include transmitting a report indicating precoding information for each of at least a subset of the set of orbital angular momentum modes, where the precoding information includes one or more first parameters common to the set of orbital angular momentum modes and one or more second parameters for respective ones of the at least the subset of the set of orbital angular momentum modes. The operations of 1510 may be performed in accordance with examples as disclosed herein. In some examples, aspects of the operations of 1510 may be performed by a report transmitter 930 as described with reference to FIG. 9.

At 1515, the method may include receiving a transmission via one or more of the set of orbital angular momentum modes based on transmitting the report indicating the precoding information. The operations of 1515 may be performed in accordance with examples as disclosed herein. In some examples, aspects of the operations of 1515 may be performed by a transmission receiver 935 as described with reference to FIG. 9.

FIG. 16 shows a flowchart illustrating a method 1600 that supports multi-mode PMI report for OAM based communication system in accordance with one or more aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1605, the method may include receiving a configuration indicating a set of orbital angular momentum modes for joint reporting, where at least one of the set of orbital angular momentum modes is associated with transmission via two or more of a set of multiple sets of antennas arranged in a set of multiple concentric circular arrays. The operations of 1605 may be performed in accordance with examples as disclosed herein. In some examples, aspects of the operations of 1605 may be performed by a OAM configuration receiver 925 as described with reference to FIG. 9.

At 1610, the method may include receiving a set of multiple reference signals associated with respective circular arrays of the set of multiple concentric circular arrays and respective orbital angular momentum modes of the set of orbital angular momentum modes, where transmitting the report is based on receiving the set of multiple reference signals. The operations of 1610 may be performed in accordance with examples as disclosed herein. In some examples, aspects of the operations of 1610 may be performed by a reference signal receiver 940 as described with reference to FIG. 9.

At 1615, the method may include transmitting a report indicating precoding information for each of at least a subset of the set of orbital angular momentum modes, where the precoding information includes one or more first parameters common to the set of orbital angular momentum modes and one or more second parameters for respective ones of the at least the subset of the set of orbital angular momentum modes. The operations of 1615 may be performed in accordance with examples as disclosed herein. In some examples, aspects of the operations of 1615 may be performed by a report transmitter 930 as described with reference to FIG. 9.

At 1620, the method may include receiving a transmission via one or more of the set of orbital angular momentum modes based on transmitting the report indicating the precoding information. The operations of 1620 may be performed in accordance with examples as disclosed herein. In some examples, aspects of the operations of 1620 may be performed by a transmission receiver 935 as described with reference to FIG. 9.

FIG. 17 shows a flowchart illustrating a method 1700 that supports multi-mode PMI report for OAM based communication system in accordance with one or more aspects of the present disclosure. The operations of the method 1700 may be implemented by a network entity or its components as described herein. For example, the operations of the method 1700 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1705, the method may include transmitting a configuration indicating a set of orbital angular momentum modes for joint reporting, where at least one of the set of orbital angular momentum modes is associated with transmission via two or more of a set of multiple sets of antennas arranged in a set of multiple concentric circular arrays. The operations of 1705 may be performed in accordance with examples as disclosed herein. In some examples, aspects of the operations of 1705 may be performed by a OAM configuration transmitter 1325 as described with reference to FIG. 13.

At 1710, the method may include receiving a report indicating precoding information for each of at least a subset of the set of orbital angular momentum modes, where the precoding information includes one or more first parameters common to the set of orbital angular momentum modes and one or more second parameters for respective ones of the at least the subset of the set of orbital angular momentum modes. The operations of 1710 may be performed in accordance with examples as disclosed herein. In some examples, aspects of the operations of 1710 may be performed by a report receiver 1330 as described with reference to FIG. 13.

At 1715, the method may include transmitting a transmission via one or more of the set of orbital angular momentum modes based on receiving the report indicating the precoding information. The operations of 1715 may be performed in accordance with examples as disclosed herein. In some examples, aspects of the operations of 1715 may be performed by a transmission transmitter 1335 as described with reference to FIG. 13.

Figure 18:
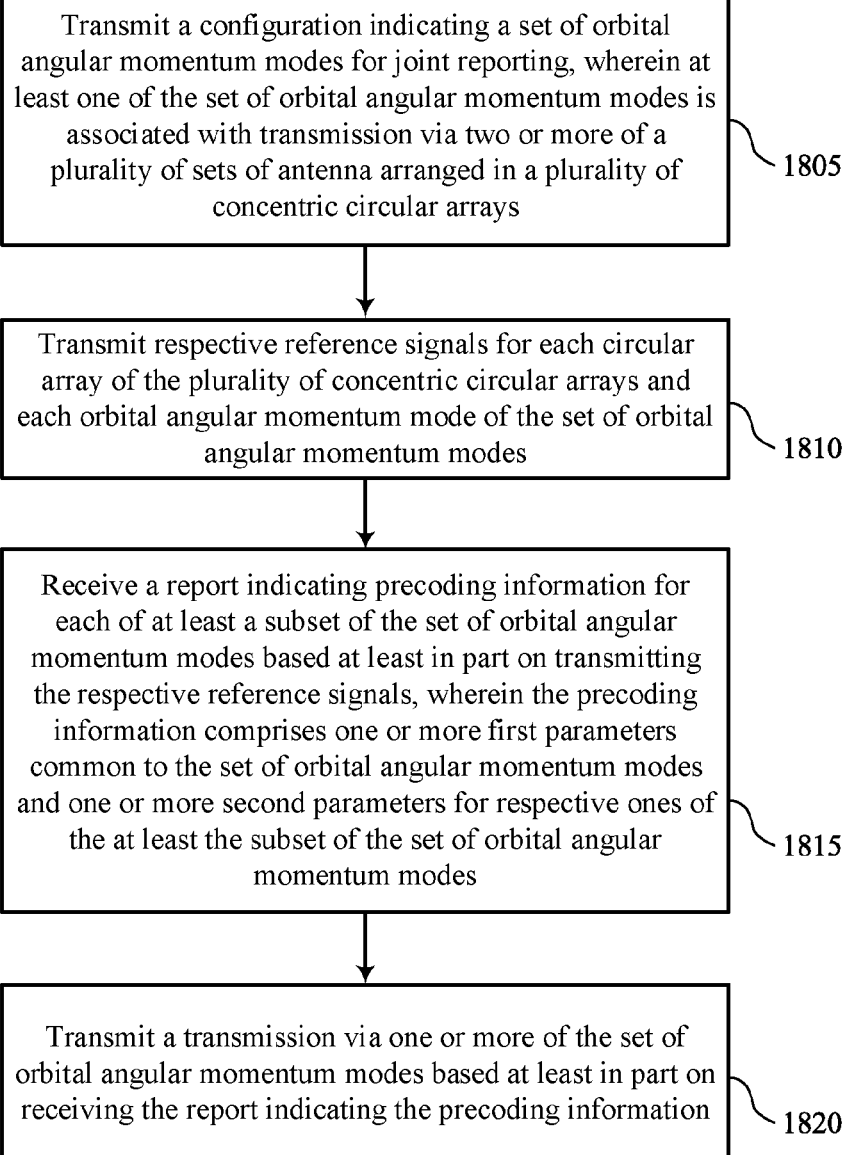

FIG. 18 shows a flowchart illustrating a method 1800 that supports multi-mode PMI report for OAM based communication system in accordance with one or more aspects of the present disclosure. The operations of the method 1800 may be implemented by a network entity or its components as described herein. For example, the operations of the method 1800 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1805, the method may include transmitting a configuration indicating a set of orbital angular momentum modes for joint reporting, where at least one of the set of orbital angular momentum modes is associated with transmission via two or more of a set of multiple sets of antennas arranged in a set of multiple concentric circular arrays. The operations of 1805 may be performed in accordance with examples as disclosed herein. In some examples, aspects of the operations of 1805 may be performed by a OAM configuration transmitter 1325 as described with reference to FIG. 13.

At 1810, the method may include transmitting respective reference signals for each circular array of the set of multiple concentric circular arrays and each orbital angular momentum mode of the set of orbital angular momentum modes, where receiving the report is based on transmitting the respective reference signals. The operations of 1810 may be performed in accordance with examples as disclosed herein. In some examples, aspects of the operations of 1810 may be performed by a reference signal transmitter 1340 as described with reference to FIG. 13.

At 1815, the method may include receiving a report indicating precoding information for each of at least a subset of the set of orbital angular momentum modes, where the precoding information includes one or more first parameters common to the set of orbital angular momentum modes and one or more second parameters for respective ones of the at least the subset of the set of orbital angular momentum modes. The operations of 1815 may be performed in accordance with examples as disclosed herein. In some examples, aspects of the operations of 1815 may be performed by a report receiver 1330 as described with reference to FIG. 13.

At 1820, the method may include transmitting a transmission via one or more of the set of orbital angular momentum modes based on receiving the report indicating the precoding information. The operations of 1820 may be performed in accordance with examples as disclosed herein. In some examples, aspects of the operations of 1820 may be performed by a transmission transmitter 1335 as described with reference to FIG. 13.

The following provides an overview of aspects of the present disclosure:

Aspect 1: A method for wireless communication, comprising: receiving a configuration indicating a set of orbital angular momentum modes for joint reporting, wherein at least one of the set of orbital angular momentum modes is associated with transmission via two or more of a plurality of sets of antennas arranged in a plurality of concentric circular arrays; transmitting a report indicating precoding information for each of at least a subset of the set of orbital angular momentum modes, wherein the precoding information comprises one or more first parameters common to the set of orbital angular momentum modes and one or more second parameters for respective ones of the at least the subset of the set of orbital angular momentum modes; and receiving a transmission via one or more of the set of orbital angular momentum modes based at least in part on transmitting the report indicating the precoding information.

Aspect 2: The method of aspect 1, wherein receiving the configuration indicating the set of orbital angular momentum modes for joint reporting further comprises: receiving the configuration indicating a threshold quantity of orbital angular momentum modes of the set of orbital angular momentum modes for simultaneous transmission via a set of antenna of the plurality of sets of antennas.

Aspect 3: The method of aspect 2, further comprising: determining a rank of a precoding matrix for the each of at least the subset of the set of orbital angular momentum modes based at least in part on receiving the configuration indicating the threshold quantity of orbital angular momentum modes of the set of orbital angular momentum modes.

Aspect 4: The method of any of aspects 1 through 3, wherein each orbital angular momentum mode of the set of orbital angular momentum modes is associated with transmission via one or more of the plurality of sets of antennas arranged in the plurality of concentric circular arrays, the method further comprising: receiving a plurality of reference signals associated with respective circular arrays of the plurality of concentric circular arrays and respective orbital angular momentum modes of the set of orbital angular momentum modes, wherein transmitting the report is based at least in part on receiving the plurality of reference signals.

Aspect 5: The method of aspect 4, wherein the configuration indicates a total quantity of circular arrays in the plurality of concentric circular arrays, and transmitting the report is based at least in part on the configuration indicating the total quantity of circular arrays.

Aspect 6: The method of any of aspects 1 through 5, further comprising: estimating a gain matrix for each orbital angular momentum mode of the set of orbital angular momentum modes; and determining the one or more first parameters common to the set of orbital angular momentum modes based at least in part on estimating the gain matrix for each orbital angular momentum mode.

Aspect 7: The method of aspect 6, further comprising: determining, for each orbital angular momentum mode, the one or more second parameters based at least in part on the one or more first parameters and the respective estimated gain matrix.

Aspect 8: The method of any of aspects 6 through 7, wherein each orbital angular momentum mode is associated with a plurality of concentric circular arrays, the method further comprising: receiving, for each orbital angular momentum mode, a set of reference signals corresponding to the respective set of circular arrays, wherein the gain matrix is estimated for each orbital angular momentum mode based at least in part on receiving the set of reference signals for each orbital angular momentum mode.

Aspect 9: The method of any of aspects 1 through 8, wherein the one or more first parameters correspond to a matrix, the method further comprising: determining a dimension of the matrix based at least in part on a third parameter indicated by the configuration.

Aspect 10: The method of any of aspects 1 through 9, further comprising: transmitting a plurality of reports indicating additional precoding information for each circular array of the plurality of concentric circular arrays, wherein each report of the plurality comprises respective additional precoding information for a different circular array of the plurality of concentric circular arrays, wherein transmitting the plurality of reports is based at least in part on transmitting the report.

Aspect 11: The method of aspect 10, further comprising: reallocating a transmission power for one or more circular arrays of the plurality of concentric circular arrays, wherein transmitting the plurality of reports is based at least in part on the reallocating.

Aspect 12: The method of any of aspects 1 through 11, wherein the one or more first parameters comprise a set of amplitudes, a set of phases, a set of codeword indices, or any combination thereof.

Aspect 13: The method of any of aspects 1 through 12, wherein the report comprises, for one or more orbital angular momentum modes of the set of orbital angular momentum modes, the one or more second parameters for a plurality of layers.

Aspect 14: The method of any of aspects 1 through 13, wherein the configuration comprises a channel state information configuration, and the report comprises a channel state information report.

Aspect 15: The method of any of aspects 1 through 14, wherein the one or more first parameters comprise an identity matrix.

Aspect 16: The method of any of aspects 1 through 15, wherein one or more of receiving the configuration, transmitting the report, and receiving the transmission is based at least in part on a first polarization, a second polarization, or both.

Aspect 17: The method of aspect 16, wherein the first polarization comprises a first linear polarization and the second polarization comprises a second linear polarization; the first polarization comprises a first rotation direction associated with a circular polarization and the second polarization comprises a second rotation direction associated with the circular polarization; or the first polarization comprises a first rotation direction associated with an elliptical polarization and the second polarization comprises a second rotation direction associated with the elliptical polarization.

Aspect 18: A method for wireless communication, comprising: transmitting a configuration indicating a set of orbital angular momentum modes for joint reporting, wherein at least one of the set of orbital angular momentum modes is associated with transmission via two or more of a plurality of sets of antennas arranged in a plurality of concentric circular arrays; receiving a report indicating precoding information for each of at least a subset of the set of orbital angular momentum modes, wherein the precoding information comprises one or more first parameters common to the set of orbital angular momentum modes and one or more second parameters for respective ones of the at least the subset of the set of orbital angular momentum modes; and transmitting a transmission via one or more of the set of orbital angular momentum modes based at least in part on receiving the report indicating the precoding information.

Aspect 19: The method of aspect 18, wherein transmitting the configuration indicating the set of orbital angular momentum modes for joint reporting further comprises: transmitting the configuration indicating a threshold quantity of orbital angular momentum modes of the set of orbital angular momentum modes for simultaneous transmission via a set of antenna of the plurality of sets of antennas.

Aspect 20: The method of any of aspects 18 through 19, wherein each orbital angular momentum mode of the set of orbital angular momentum modes is associated with transmission via one or more of the plurality of sets of antennas arranged in the plurality of concentric circular arrays, the method further comprising: transmitting respective reference signals for each circular array of the plurality of concentric circular arrays and each orbital angular momentum mode of the set of orbital angular momentum modes, wherein receiving the report is based at least in part on transmitting the respective reference signals.

Aspect 21: The method of aspect 20, wherein the configuration indicates a total quantity of circular arrays in the plurality of concentric circular arrays, and receiving the report is based at least in part on the configuration indicating the total quantity of circular arrays.

Aspect 22: The method of any of aspects 18 through 21, further comprising: receiving a plurality of reports indicating additional precoding information for each circular array of the plurality of concentric circular arrays, wherein each report of the plurality comprises respective additional precoding information for a different circular array of the plurality of concentric circular arrays, wherein transmitting the plurality of reports is based at least in part on transmitting the report.

Aspect 23: The method of any of aspects 18 through 22, wherein the one or more first parameters correspond to a matrix, and the configuration indicates a third parameter associated with a size of the matrix.

Aspect 24: The method of any of aspects 18 through 23, wherein the one or more first parameters comprise a set of amplitudes, a set of phases, a set of codeword indices, or any combination thereof.

Aspect 25: The method of any of aspects 18 through 24, wherein the report comprises, for one or more orbital angular momentum modes of the set of orbital angular momentum modes, the one or more second parameters for a plurality of layers.

Aspect 26: The method of any of aspects 18 through 25, wherein the configuration comprises a channel state information configuration, the report comprises a channel state information report, the one or more first parameters comprise an identity matrix, or any combination thereof.

Aspect 27: The method of any of aspects 18 through 26, wherein one or more of transmitting the configuration, receiving the report, and transmitting the transmission is based at least in part on a first polarization, a second polarization, or both.

Aspect 28: The method of aspect 27, wherein the first polarization comprises a first linear polarization and the second polarization comprises a second linear polarization; the first polarization comprises a first rotation direction associated with a circular polarization and the second polarization comprises a second rotation direction associated with the circular polarization; or the first polarization comprises a first rotation direction associated with an elliptical polarization and the second polarization comprises a second rotation direction associated with the elliptical polarization.

Aspect 29: An apparatus comprising a memory, transceiver, and at least one processor coupled with the memory and the transceiver, the at least one processor configured to cause the apparatus to perform a method of any of aspects 1 through 17.

Aspect 30: An apparatus for wireless communication, comprising at least one means for performing a method of any of aspects 1 through 17.

Aspect 31: A non-transitory computer-readable medium storing code for wireless communication, the code comprising instructions executable by a processor to perform a method of any of aspects 1 through 17.

Aspect 32: An apparatus comprising a memory, transceiver, and at least one processor coupled with the memory and the transceiver, the at least one processor configured to cause the apparatus to perform a method of any of aspects 18 through 28.

Aspect 33: An apparatus for wireless communication, comprising at least one means for performing a method of any of aspects 18 through 28.

Aspect 34: A non-transitory computer-readable medium storing code for wireless communication, the code comprising instructions executable by a processor to perform a method of any of aspects 18 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication, comprising:
receiving a configuration indicating a set of orbital angular momentum modes for joint reporting, wherein at least one of the set of orbital angular momentum modes is associated with transmission via two or more of a plurality of sets of antennas arranged in a plurality of concentric circular arrays;
transmitting a report indicating precoding information for each of at least two or more orbital angular momentum modes of the set of orbital angular momentum modes, wherein a first portion of the precoding information comprises one or more first parameters common to the set of orbital angular momentum modes and a second portion of the precoding information comprises one or more second parameters for respective ones of the at least two or more orbital angular momentum modes of the set of orbital angular momentum modes; and
receiving a transmission via one or more of the set of orbital angular momentum modes based at least in part on transmitting the report indicating the precoding information.

2. The method of claim 1, wherein receiving the configuration indicating the set of orbital angular momentum modes for joint reporting further comprises:
receiving the configuration indicating a threshold quantity of orbital angular momentum modes of the set of orbital angular momentum modes for simultaneous transmission via a set of antenna of the plurality of sets of antennas.

3. The method of claim 2, further comprising:
determining a rank of a precoding matrix for each of the at least two or more orbital angular momentum modes of the set of orbital angular momentum modes based at least in part on receiving the configuration indicating the threshold quantity of orbital angular momentum modes of the set of orbital angular momentum modes.

4. The method of claim 1, wherein each orbital angular momentum mode of the set of orbital angular momentum modes is associated with transmission via one or more of the plurality of sets of antennas arranged in the plurality of concentric circular arrays, the method further comprising:
receiving a plurality of reference signals associated with respective circular arrays of the plurality of concentric circular arrays and respective orbital angular momentum modes of the set of orbital angular momentum modes, wherein transmitting the report is based at least in part on receiving the plurality of reference signals.

5. The method of claim 4, wherein:
the configuration indicates a total quantity of circular arrays in the plurality of concentric circular arrays, and
transmitting the report is based at least in part on the configuration indicating the total quantity of circular arrays.

6. The method of claim 1, further comprising:
estimating a gain matrix for each orbital angular momentum mode of the set of orbital angular momentum modes; and
determining the one or more first parameters common to the set of orbital angular momentum modes based at least in part on estimating the gain matrix for each orbital angular momentum mode.

7. The method of claim 6, further comprising:
determining, for each orbital angular momentum mode, the one or more second parameters based at least in part on the one or more first parameters and the respective estimated gain matrix.

8. The method of claim 6, wherein each orbital angular momentum mode is associated with a respective plurality of concentric circular arrays, the method further comprising:
receiving, for each orbital angular momentum mode, a set of reference signals corresponding to the respective plurality of concentric circular arrays, wherein the gain matrix is estimated for each orbital angular momentum mode based at least in part on receiving the set of reference signals for each orbital angular momentum mode.

9. The method of claim 1, wherein the one or more first parameters correspond to a matrix, the method further comprising:
determining a dimension of the matrix based at least in part on a third parameter indicated by the configuration.

10. The method of claim 1, further comprising:
transmitting a plurality of reports indicating additional precoding information for each circular array of the plurality of concentric circular arrays, wherein each report of the plurality comprises respective additional precoding information for a different circular array of the plurality of concentric circular arrays, wherein transmitting the plurality of reports is based at least in part on transmitting the report.

11. The method of claim 10, further comprising:
reallocating a transmission power for one or more circular arrays of the plurality of concentric circular arrays, wherein transmitting the plurality of reports is based at least in part on the reallocating.

12. The method of claim 1, wherein the one or more first parameters comprise a set of amplitudes, a set of phases, a set of codeword indices, or any combination thereof.

13. The method of claim 1, wherein the report comprises, for one or more orbital angular momentum modes of the set of orbital angular momentum modes, the one or more second parameters for a plurality of layers.

14. The method of claim 1, wherein:

the configuration comprises a channel state information configuration, and the report comprises a channel state information report.

15. The method of claim 1, wherein the one or more first parameters comprise an identity matrix.

16. The method of claim 1, wherein one or more of receiving the configuration, transmitting the report, and receiving the transmission is based at least in part on a first polarization, a second polarization, or both.

17. The method of claim 16, wherein:

the first polarization comprises a first linear polarization and the second polarization comprises a second linear polarization;

the first polarization comprises a first rotation direction associated with a circular polarization and the second polarization comprises a second rotation direction associated with the circular polarization; or the first polarization comprises a first rotation direction associated with an elliptical polarization and the second polarization comprises a second rotation direction associated with the elliptical polarization.

18. A method for wireless communication, comprising:

transmitting a configuration indicating a set of orbital angular momentum modes for joint reporting, wherein at least one of the set of orbital angular momentum modes is associated with transmission via two or more of a plurality of sets of antennas arranged in a plurality of concentric circular arrays;

receiving a report indicating precoding information for each of at least two or more orbital angular momentum modes of the set of orbital angular momentum modes, wherein a first portion of the precoding information comprises one or more first parameters common to the set of orbital angular momentum modes and a second portion of the precoding information comprises one or more second parameters for respective ones of the at least two or more orbital angular momentum modes of the set of orbital angular momentum modes; and transmitting a transmission via one or more of the set of orbital angular momentum modes based at least in part on receiving the report indicating the precoding information.

19. The method of claim 18, wherein transmitting the configuration indicating the set of orbital angular momentum modes for joint reporting further comprises:

transmitting the configuration indicating a threshold quantity of orbital angular momentum modes of the set of orbital angular momentum modes for simultaneous transmission via a set of antenna of the plurality of sets of antennas.

20. The method of claim 18, wherein each orbital angular momentum mode of the set of orbital angular momentum modes is associated with transmission via one or more of the plurality of sets of antennas arranged in the plurality of concentric circular arrays, the method further comprising:

transmitting respective reference signals for each circular array of the plurality of concentric circular arrays and each orbital angular momentum mode of the set of orbital angular momentum modes, wherein receiving the report is based at least in part on transmitting the respective reference signals.

21. The method of claim 20, wherein:

the configuration indicates a total quantity of circular arrays in the plurality of concentric circular arrays, and receiving the report is based at least in part on the configuration indicating the total quantity of circular arrays.

22. The method of claim 18, further comprising:

receiving a plurality of reports indicating additional precoding information for each circular array of the plurality of concentric circular arrays, wherein each report of the plurality comprises respective additional precoding information for a different circular array of the plurality of concentric circular arrays, wherein transmitting the plurality of reports is based at least in part on transmitting the report.

23. The method of claim 18, wherein:

the one or more first parameters correspond to a matrix, and the configuration indicates a third parameter associated with a size of the matrix.

24. The method of claim 18, wherein the one or more first parameters comprise a set of amplitudes, a set of phases, a set of codeword indices, or any combination thereof.

25. The method of claim 18, wherein the report comprises, for one or more orbital angular momentum modes of the set of orbital angular momentum modes, the one or more second parameters for a plurality of layers.

26. The method of claim 18, wherein the configuration comprises a channel state information configuration, the report comprises a channel state information report, the one or more first parameters comprise an identity matrix, or any combination thereof.

27. The method of claim 18, wherein one or more of transmitting the configuration, receiving the report, and transmitting the transmission is based at least in part on a first polarization, a second polarization, or both.

28. The method of claim 27, wherein:

the first polarization comprises a first linear polarization and the second polarization comprises a second linear polarization;

the first polarization comprises a first rotation direction associated with a circular polarization and the second polarization comprises a second rotation direction associated with the circular polarization; or the first polarization comprises a first rotation direction associated with an elliptical polarization and the second polarization comprises a second rotation direction associated with the elliptical polarization.

29. An apparatus for wireless communication, comprising:

one or more memories; and one or more processors coupled with the one or more memories, the one or more processors configured to:

receive a configuration indicating a set of orbital angular momentum modes for joint reporting, wherein at least one of the set of orbital angular momentum modes is associated with transmission via two or more of a plurality of sets of antennas arranged in a plurality of concentric circular arrays;

transmit a report indicating precoding information for each of at least two or more orbital angular momentum modes of the set of orbital angular momentum modes, wherein a first portion of the precoding information comprises one or more first parameters common to the set of orbital angular momentum modes and a second portion of the precoding information comprises one or more second parameters for respective ones of the at least two or more orbital angular momentum modes of the set of orbital angular momentum modes; and receive a transmission via one or more of the set of orbital angular momentum modes based at least in part on transmitting the report indicating the precoding information.

30. An apparatus for wireless communication, comprising:

one or more memories; and one or more processors coupled with the one or more memories, the one or more processors configured to:

transmit a configuration indicating a set of orbital angular momentum modes for joint reporting, wherein at least one of the set of orbital angular momentum modes is associated with transmission via two or more of a plurality of sets of antennas arranged in a plurality of concentric circular arrays;

receive a report indicating precoding information for each of at least two or more orbital angular momentum modes of the set of orbital angular momentum modes, wherein a first portion of the precoding information comprises one or more first parameters common to the set of orbital angular momentum modes and a second portion of the precoding information comprises one or more second parameters for respective ones of the at least two or more orbital angular momentum modes of the set of orbital angular momentum modes; and transmit a transmission via one or more of the set of orbital angular momentum modes based at least in part on receiving the report indicating the precoding information.

* * * * *